US011325362B2

(12) United States Patent
Inagaki et al.

(10) Patent No.: US 11,325,362 B2
(45) Date of Patent: *May 10, 2022

(54) LAYERED POLYESTER FILM

(71) Applicants: TOYOBO CO., LTD., Osaka (JP); Furanix Technologies B.V., Amsterdam (NL)

(72) Inventors: Jun Inagaki, Otsu (JP); Kaoru Sawada, Otsu (JP); Yukihiro Numata, Otsu (JP); Jesper Gabriel Van Berkel, Amsterdam (NL)

(73) Assignees: TOYOBO CO., LTD., Osaka (JP); Furanix Technologies B.V., Amsterdam (NL)

( * ) Notice: Subject to any disclaimer, the term of this patent is extended or adjusted under 35 U.S.C. 154(b) by 246 days.

This patent is subject to a terminal disclaimer.

(21) Appl. No.: 16/066,232

(22) PCT Filed: Dec. 26, 2016

(86) PCT No.: PCT/JP2016/088618
§ 371 (c)(1),
(2) Date: Jun. 26, 2018

(87) PCT Pub. No.: WO2017/115737
PCT Pub. Date: Jul. 6, 2017

(65) Prior Publication Data
US 2020/0269560 A1 Aug. 27, 2020

(30) Foreign Application Priority Data

Dec. 28, 2015 (JP) .............................. JP2015-257296

(51) Int. Cl.
| B32B 27/36 | (2006.01) |
| B32B 27/30 | (2006.01) |
| B32B 27/40 | (2006.01) |
| C08G 63/672 | (2006.01) |
| C08J 7/043 | (2020.01) |
| C08J 7/046 | (2020.01) |
| C08J 7/048 | (2020.01) |
| C08J 7/056 | (2020.01) |
| C08J 7/06 | (2006.01) |
| C08J 7/04 | (2020.01) |
| C08L 67/02 | (2006.01) |
| C08G 63/16 | (2006.01) |

(Continued)

(52) U.S. Cl.
CPC ............ *B32B 27/36* (2013.01); *B32B 27/308* (2013.01); *B32B 27/40* (2013.01); *C08G 63/672* (2013.01); *C08J 7/043* (2020.01); *C08J 7/046* (2020.01); *C08J 7/048* (2020.01); *C08J 7/056* (2020.01); *B32B 2255/10* (2013.01); *B32B 2255/26* (2013.01); *B32B 2264/10* (2013.01); *B32B 2307/518* (2013.01); *B32B 2307/724* (2013.01); *B32B 2307/7242* (2013.01); *B32B 2307/7244* (2013.01); *B32B 2307/732* (2013.01); *B32B 2307/734* (2013.01); *B32B 2307/736* (2013.01); *B32B 2307/744* (2013.01); *B32B 2307/746* (2013.01); *B32B 2367/00* (2013.01); *C08G 63/12* (2013.01); *C08G 63/123* (2013.01); *C08G 63/127* (2013.01); *C08G 63/16* (2013.01); *C08G 63/18* (2013.01); *C08G 2230/00* (2013.01); *C08J 7/04* (2013.01); *C08J 7/0427* (2020.01); *C08J 7/06* (2013.01); *C08L 67/02* (2013.01); *C08L 2203/16* (2013.01); *Y10T 428/31565* (2015.04); *Y10T 428/31786* (2015.04); *Y10T 428/31797* (2015.04)

(58) Field of Classification Search
None
See application file for complete search history.

(56) References Cited

U.S. PATENT DOCUMENTS

| 2,551,731 A | 5/1951 | Gordon et al. |
| 4,439,479 A * | 3/1984 | Kanai ...................... B05D 5/08 |
| | | 428/148 |

(Continued)

FOREIGN PATENT DOCUMENTS

| CN | 101899145 A | * 12/2010 |
| CN | 101959941 A | 1/2011 |

(Continued)

OTHER PUBLICATIONS

"The Furan Counterpart to Poly(ethylene terephthalate): An Alternative Material Based on Renewable Resources" Journal of Polymer Science: Part A: Polymer Chemistry, vol. 47, 295-298 (2009) (Year: 2009).*

(Continued)

*Primary Examiner* — Vivian Chen
(74) *Attorney, Agent, or Firm* — Leydig, Voit & Mayer, Ltd.

(57) ABSTRACT

To provide a layered polyester film having excellent mechanical properties, transparency, heat resistance, and gas barrier property. A layered polyester film including a polyester film and a thin film layer, wherein the polyester film is a biaxially oriented polyester film including a dicarboxylic acid component containing mainly a furandicarboxylic acid and a glycol component containing mainly ethylene glycol, the covering layer is formed on at least one surface of the polyester film, and the layered polyester film has a plane orientation coefficient ΔP of not less than 0.100 and not more than 0.200, and a thickness of the layered polyester film is not thinner than 1 μm and not thicker than 300 μm.

13 Claims, No Drawings

(51) Int. Cl.
  *C08G 63/127* (2006.01)
  *C08G 63/18* (2006.01)
  *C08G 63/12* (2006.01)
  *C08G 63/123* (2006.01)

(56) References Cited

U.S. PATENT DOCUMENTS

| | | | | |
|---|---|---|---|---|
| 5,096,784 | A * | 3/1992 | Culbertson | C09D 133/12 |
| | | | | 428/482 |
| 5,128,206 | A * | 7/1992 | Fiard | G11B 5/7305 |
| | | | | 428/337 |
| 6,254,996 | B1 * | 7/2001 | Fukuda | C08J 7/0427 |
| | | | | 428/480 |
| H1982 | H * | 8/2001 | Dunn et al. | B05D 1/36 |
| | | | | 427/258 |
| 10,407,555 | B2 * | 9/2019 | Inagaki | C08G 63/16 |
| 10,941,244 | B2 * | 3/2021 | Inagaki | C08J 7/044 |
| 2004/0146724 | A1 * | 7/2004 | Peiffer | B32B 27/20 |
| | | | | 428/458 |
| 2005/0100723 | A1 * | 5/2005 | Tanaka | C08L 2666/18 |
| | | | | 428/220 |
| 2008/0015108 | A1 * | 1/2008 | Yamamoto | B41M 5/41 |
| | | | | 503/227 |
| 2008/0038539 | A1 * | 2/2008 | Yokota | B32B 33/00 |
| | | | | 428/323 |
| 2009/0032602 | A1 | 2/2009 | Nishi et al. | |
| 2009/0124763 | A1 | 5/2009 | Matsuda et al. | |
| 2011/0218316 | A1 | 9/2011 | Drysdale et al. | |
| 2012/0053317 | A1 * | 3/2012 | Matsumura | C08J 5/18 |
| | | | | 528/279 |
| 2012/0178897 | A1 * | 7/2012 | Nozawa | H01L 31/049 |
| | | | | 528/308.1 |
| 2012/0207956 | A1 | 8/2012 | Matsuda et al. | |
| 2012/0258299 | A1 | 10/2012 | Matsuda et al. | |
| 2012/0288692 | A1 | 11/2012 | Broyles et al. | |
| 2012/0288693 | A1 | 11/2012 | Stanley et al. | |
| 2013/0011631 | A1 * | 1/2013 | Sakellarides | B32B 27/36 |
| | | | | 428/195.1 |
| 2013/0095271 | A1 * | 4/2013 | Carman, Jr | C08G 63/199 |
| | | | | 428/36.92 |
| 2013/0344345 | A1 * | 12/2013 | Sakellarides | C08K 5/3475 |
| | | | | 428/458 |
| 2014/0004286 | A1 * | 1/2014 | Sakellarides | B32B 27/08 |
| | | | | 428/36.6 |
| 2014/0099455 | A1 * | 4/2014 | Stanley | B32B 27/32 |
| | | | | 428/34.3 |
| 2014/0234493 | A1 | 8/2014 | Forloni | |
| 2014/0322463 | A1 | 10/2014 | Bashir et al. | |
| 2014/0336349 | A1 * | 11/2014 | Sipos | C08G 63/672 |
| | | | | 528/285 |
| 2014/0363546 | A1 | 12/2014 | Zhou et al. | |
| 2015/0004387 | A1 * | 1/2015 | Sargeant | C09D 5/002 |
| | | | | 428/220 |
| 2015/0119548 | A1 * | 4/2015 | Takahashi | B29D 7/01 |
| | | | | 528/308.2 |
| 2015/0141584 | A1 * | 5/2015 | Saywell | C08G 63/181 |
| | | | | 525/444 |
| 2015/0251395 | A1 | 9/2015 | Haak et al. | |
| 2015/0307704 | A1 | 10/2015 | Bhattacharjee et al. | |
| 2015/0343746 | A1 * | 12/2015 | Bhattacharjee | B32B 27/08 |
| | | | | 428/212 |
| 2015/0353692 | A1 * | 12/2015 | Bhattacharjee | C08J 5/18 |
| | | | | 428/457 |
| 2016/0002395 | A1 | 1/2016 | Matsuda et al. | |
| 2016/0108171 | A1 | 4/2016 | Haruta et al. | |
| 2016/0200862 | A1 | 7/2016 | Bastioli et al. | |
| 2016/0272771 | A1 * | 9/2016 | Goto | B32B 27/18 |
| 2016/0319066 | A1 | 11/2016 | Shimoharai et al. | |
| 2017/0297256 | A1 * | 10/2017 | Kolstad | B32B 27/32 |
| 2017/0368807 | A1 | 12/2017 | Sakellarides et al. | |
| 2018/0170019 | A1 | 6/2018 | Fayet et al. | |
| 2018/0244878 | A1 | 8/2018 | Inagaki et al. | |
| 2018/0311939 | A1 * | 11/2018 | Larrieu | B32B 27/10 |

| | | | | |
|---|---|---|---|---|
| 2019/0106534 | A1 * | 4/2019 | Inagaki | C08J 7/0427 |
| 2019/0169384 | A1 | 6/2019 | Goto et al. | |
| 2019/0225745 | A1 | 7/2019 | Sakano et al. | |
| 2019/0366616 | A1 | 12/2019 | Berny et al. | |
| 2019/0389189 | A1 * | 12/2019 | Hayakawa | B32B 27/36 |
| 2020/0269559 | A1 * | 8/2020 | Inagaki | C08J 7/043 |
| 2020/0269560 | A1 * | 8/2020 | Inagaki | C08J 7/0423 |
| 2021/0016484 | A1 * | 1/2021 | Hayakawa | B29C 48/305 |
| 2021/0147618 | A1 * | 5/2021 | Inagaki | C08J 7/056 |

FOREIGN PATENT DOCUMENTS

| | | | |
|---|---|---|---|
| CN | 103459148 | A * | 12/2013 |
| CN | 104053535 | A * | 9/2014 |
| CN | 104955646 | A * | 9/2015 |
| CN | 105143967 | A * | 12/2015 |
| EP | 2511320 | A1 | 10/2012 |
| EP | 3438164 | A1 | 2/2019 |
| JP | 11-010725 | A * | 1/1999 |
| JP | H11-010725 | A | 1/1999 |
| JP | 2000-119414 | A * | 4/2000 |
| JP | 2001-001399 | A | 1/2001 |
| JP | 2001-232739 | A * | 8/2001 |
| JP | 2001-342267 | A * | 12/2001 |
| JP | 2002-370277 | A * | 12/2002 |
| JP | 2003-071969 | A * | 3/2003 |
| JP | 2003-200546 | A * | 7/2003 |
| JP | 2007-118476 | A * | 5/2007 |
| JP | 3982385 | B2 * | 9/2007 |
| JP | 4470491 | B2 * | 6/2010 |
| JP | 4881127 | B2 | 2/2012 |
| JP | 2012-094699 | A | 5/2012 |
| JP | 2012-229395 | A | 11/2012 |
| JP | 2013-155389 | A | 8/2013 |
| JP | 2015-157411 | A | 9/2013 |
| JP | 2014-043571 | A | 3/2014 |
| JP | 2014-073598 | A * | 4/2014 |
| JP | 2015-506389 | A | 3/2015 |
| JP | 2015-098612 | A | 5/2015 |
| TW | 200951163 | A | 12/2009 |
| TW | 201518399 | A | 5/2015 |
| TW | 2016-015742 | A * | 5/2016 |
| TW | 201615742 | A | 5/2016 |
| WO | WO 2012/142271 | A1 | 10/2012 |
| WO | WO 2013/097013 | A1 | 7/2013 |
| WO | WO 2014/100256 | A2 | 6/2014 |
| WO | WO 2014/100265 | A1 | 6/2014 |
| WO | WO 2015/093524 | A1 | 6/2015 |
| WO | WO 2016/032330 | A * | 3/2016 |
| WO | WO 2016/032330 | A1 | 3/2016 |
| WO | WO 2016/123209 | A1 | 8/2016 |
| WO | WO 2017/038092 | A1 | 3/2017 |
| WO | WO 2017/115736 | A1 | 7/2017 |
| WO | WO 2017/115737 | A1 | 7/2017 |
| WO | WO 2017/169553 | A1 | 10/2017 |
| WO | WO 2018/012572 | A1 | 1/2018 |

OTHER PUBLICATIONS

China National Intellectual Property Administration, First Office Action in Chinese Patent Application No. 201680076574.4 (dated Aug. 21, 2019).
China National Intellectual Property Administration, First Office Action in Chinese Patent Application No. 201680076573.X (dated Aug. 30, 2019).
Australian Patent Office, Examination Report in Australian Patent Application No. 2016381909 (dated May 5, 2020).
China National Intellectual Property Administration, The Second Office Action in Chinese Patent Application No. 201680076574.4 (dated Mar. 16, 2020).
Indian Patent Office, Examination Report in Indian Patent Application No. 201847027693 (dated May 15, 2020).
European Patent Office, Extended European Search Report in European Patent Application No. 16881712.0 (dated Jun. 26, 2019).
Hachihama et al., "Syntheses of Polyesters containing Furan Ring," *Technology Reports of the Osaka University*, 8(333): 475-480 (1958).

(56) References Cited

OTHER PUBLICATIONS

Japanese Patent Office, International Search Report in International Patent Application No. PCT/JP2016/088617 (dated Mar. 21, 2017).
Japanese Patent Office, International Search Report in International Patent Application No. PCT/JP2016/088618 (dated Mar. 21, 2017).
Taiwan Intellectual Property Office, First Office Action in Taiwanese Patent Application No. 105143160 (dated Apr. 27, 2020).
Taiwan Intellectual Property Office, First Office Action in Taiwanese Patent Application No. 105143162 (dated Apr. 27, 2020).
Nakajima et al., "The Recent Developments in Biobased Polymers toward General and Engineering Applications: Polymers that Are Upgraded from Biodegradable Polymers, Analogous to Petroleum-Derived Polymers, and Newly Developed," *Polymers*, 9: 523 (2017).
OMNEXUS, "Polyethylene Furanoate (PEF)—The Rising Star Amongst Today's Bioplastics" (2019) [obtained at: https://omnexus.specialchem.com/selection-guide/polyethylene-furanoate-pef-bioplastic].
China National Intellectual Property Administration, Rejection Decision in Chinese Patent Application No. 201680076574.4 (dated Aug. 24, 2020).
European Patent Office, Communication Pursuant to Article 94(3) EPC in European Patent Application No. 16881711.2 (dated Nov. 4, 2020).
China National Intellectual Property Administration, First Office Action in Chinese Patent Application No. 201780021682.6 (dated Dec. 4, 2020).
China National Intellectual Property Administration, First Office Action in Chinese Patent Application No. 201880015127.7 (dated Oct. 22, 2020).
European Patent Office, Extended European Search Report in European Patent Application No. 18760798.1 (dated Dec. 8, 2020).
Japanese Patent Office, Notice of Reasons for Refusal in Japanese Patent Application No. 2017-559174 (dated Jan. 19, 2021).
Japanese Patent Office, Notice of Reasons for Refusal in Japanese Patent Application No. 2017-559175 (dated Jan. 19, 2021).
Australian Patent Office, Examination Report No. 1 in Australian Patent Application No. 2017242303 (dated Jun. 29, 2020).
European Patent Office, Extended European Search Report in European Patent Application No. 17774098.2 (dated Nov. 8, 2019).
European Patent Office, International Search Report in International Patent Application No. PCT/JP2016/003976 (dated Nov. 23, 2016).
Japanese Patent Office, Notification of Reasons for Refusal in Japanese Patent Application No. 2017-506943 (dated Sep. 13, 2017).
Japanese Patent Office, International Search Report in International Patent Application No. PCT/JP2017/008902 (dated May 16, 2017).
Japanese Patent Office, International Search Report in International Patent Application No. PCT/JP2018/007405 (dated May 29, 2018).
Taiwan Intellectual Property Office, First Office Action in Taiwanese Patent Application No. 106107343 (dated Jun. 16, 2020).
China National Intellectual Property Administration, The Second Office Action in Chinese Patent Application No. 201880015127.7 (dated Apr. 8, 2021).
Japanese Patent Office, Notice of Reasons for Refusal in Japanese Patent Application No. 2018-508875 (dated Mar. 2, 2021).
Taiwan Intellectual Property Office, Second Office Action in Taiwanese Patent Application No. 105143160 (dated Mar. 30, 2021).
Taiwan Intellectual Property Office, First Office Action in Taiwanese Patent Application No. 109146750 (dated Apr. 30, 2021).
Taiwan Intellectual Property Office, First Office Action in Taiwanese Patent Application No. 107106833 (dated Apr. 16, 2021).
Taiwan Intellectual Property Office, Rejection Decision in Taiwanese Patent Application No. 105143162 (dated Jul. 21, 2021).
China National Intellectual Property Administration, The First Office Action in Chinese Patent Application No. 201880015158.2 (dated Jul. 6, 2021).
European Patent Office, Extended European Search Report in European Patent Application No. 18760795.7 (dated Dec. 11, 2020).
Japanese Patent Office, International Search Report in International Patent Application No. PCT/JP2018/007404 (dated May 29, 2018).
Japanese Patent Office, Notice of Reasons for Refusal in Japanese Patent Application No. 2019-503041 (dated Aug. 10, 2021).
Japanese Patent Office, Notice of Reasons for Refusal in Japanese Patent Application No. 2019-503042 (dated Aug. 10, 2021).
Korean Intellectual Property Office, Notice of Preliminary Rejection in Korean Patent Application No. 10-2019-7028221 (dated Sep. 9, 2021).
Korean Intellectual Property Office, Notice of Reason for Refusal in Korean Patent Application No. 10-2018-7030855 (dated Aug. 19, 2021).
Taiwanese Patent Office, First Office Action in Taiwanese Patent Application No. 107106834 (dated Jul. 20, 2021).
U.S. Appl. No. 15/756,909, filed Mar. 1, 2018.
U.S. Appl. No. 16/066,212, filed Jun. 26, 2018.
U.S. Appl. No. 16/089,693, filed Sep. 28, 2018.
U.S. Appl. No. 16/490,307, filed Aug. 30, 2019.
U.S. Appl. No. 17/162,351, filed Jan. 29, 2021.
U.S. Appl. No. 16/490,205, filed Aug. 30, 2019.
European Patent Office, Communication Pursuant to Article 94(3) EPC in European Patent Application No. 16767027,2 (dated Nov. 19, 2021).
Taiwan Intellectual Property Office, Rejection Decision in Taiwanese Patent Application No. 105143160 (dated Oct. 1, 2021).
Taiwan Intellectual Property Office, Rejection Decision in Taiwanese Patent Application No. 107106834 (dated Dec. 9, 2021).
Korean Intellectual Property Office, Notice of Preliminary Rejection in Korean Patent Application No. 10-2019-7028220 (dated Jan. 20, 2022).

\* cited by examiner

LAYERED POLYESTER FILM

CROSS-REFERENCE TO RELATED APPLICATIONS

This patent application is the U.S. national phase of International Patent Application No. PCT/JP2016/088618, filed Dec. 26, 2016, which claims the benefit of Japanese Patent Application No. 2015-257296, filed on Dec. 28, 2015, which are incorporated by reference in their entireties herein.

TECHNICAL FIELD

The present invention relates to a layered polyester film comprising a polyester film having a furandicarboxylic acid unit and a covering layer. More specifically, the present invention relates to a layered polyester film having excellent mechanical properties, transparency, heat resistance, and a gas barrier property and also having an excellent easily slidable property, and a film roll obtained by winding the film.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packing materials, and automobiles. Among plastic films, biaxially stretched PET films have been used widely for industrial and packing fields because of excellent balance between cost and mechanical strength, heat resistance, dimensional stability, chemical resistance, optical properties, etc.

In the field of industrial films, PET films can be used as functional films for flat panel displays (FPD) such as liquid crystal displays and plasma display because of having excellent transparency. Further, PET films provided with hydrolysis resistance have been used for films for solar cell back sheets and also used for various purposes such as functional films and base films.

In the field of packing films, PET films have been used for applications such as wrapping of foodstuff, shrink labels for bottles, and gas barrier films. Particularly, films excellent in gas barrier properties have been used as packing materials or gas shielding materials which are required to have airtightness for foodstuff, pharmaceutical products, electronic parts, and the like, and there has been a growing demand for such films in recent years.

On the other hand, resins having biodegradability and resins produced from biomass-derived raw materials have drawn attention as environmentally friendly-type or environmentally sustainable-type materials.

From the above-mentioned viewpoint, many investigations have been performed for the purpose of providing a reproducible polymer for replacing petroleum derivatives such as PET. It is known that furandicarboxylic acids (FDCA) is similar to terephthalic acid in terms of solubility in hot water and stability to acidic reagents and FDCA has a planar structure, therefore furan type materials obtained by polycondensation of FDCA and diols have been proposed (Patent Document 1 and Non-Patent Document 1).

Only the inching point in the physical properties of these polymers disclosed is made clear, and mechanical strength is unclear. It is unknown whether or not thermoplastic resin compositions containing a furandicarboxylic acid unit can be used in the fields of industrial and packing films.

Polymer compounds usable for electric and electronic parts or the like by specifying the degree of polymerization have been proposed for thermoplastic resin compositions containing, mainly polybutylene furandicarboxylate (PBF), some kinds of furandicarboxylic acid units (Patent Document 2). Further, polyesters excellent in mechanical strength by specifying reduced viscosity and terminal acid value have been proposed (Patent Documents 3 and 4).

However, thermally press-molded products of PBF disclosed in Patent Document 2 have low transparency and are thus limited for uses in the fields of industrial and packing films. In the mechanical properties of 200 μm sheet products having a furandicarboxylic acid structure disclosed in Patent Documents 3 and 4, both breaking elongation and breaking strength are low and it is not conceivable to use such sheet products in the fields of industrial and packing films.

Sheets obtained from polyethylene furandicarboxylate (PEF), PEF derivatives and blends of PEF derivatives and copolymer polyesters have been investigated to be formed into uniaxially stretched films (Patent Documents 5 and 6).

Patent Document 5 discloses that as compared with a sheet made of a thermoplastic resin composition containing a furandicarboxylic acid unit, a film obtained by uniaxially stretching the sheet to 5 to 16 times is improved in breaking elongation, depending on the kinds of blends and the blending ratio of furan dicarboxylic acid. However, no significant improvement in breaking elongation is confirmed unless cyclohexanedimethanol-copolymerized PET, which is widely known for improving breaking elongation, is blended. It must be said that the effect is limited depending on the blending ratio and the film has not been used so far in the fields of industrial and packing films.

Patent Document 6 discloses a PET film uniaxially stretched about 1.6 times by using rolling rolls. The film is shown to be a plastic film excellent in gas barrier properties, but it merely mentions the advantages of barrier properties derived from chemical structure of PEF, and mechanical strength which is important for packing materials is not made clear, so that the film has not been used so far in the field of gas barrier film containing a furandicarboxylic acid unit for packing.

CITATION LIST

Patent Literature

[Patent Document 1] U.S. Pat. No. 2,551,731
[Patent Document 2] Japanese Patent No. 4881127
[Patent Document 3] JP-A-2013-155389
[Patent Document 4] JP-A-2015-098612
[Patent Document 5] JP-T-2015-506389
[Patent Document 6] JP-A-2012-229395

NON PATENT LITERATURE

[Non-Patent Document 1] Y Hachihama, T. Shono, and K. Hyono, Technol. Repts. Osaka Univ., 8, 475 (1958)

SUMMARY OF INVENTION

Technical Problem

Currently, the resin compositions each containing a furandicarboxylic acid proposed in the above-mentioned patent documents have been investigated for replacing PET.

But because of inferior mechanical properties, the resin compositions cannot be used for industrial and packing films. Further, no investigation is performed on heat resistance and transparency, and it is unknown whether or not the resin compositions are applicable in the fields of industrial and packing films. No investigation on an easily slidable property has been made, so that the resin compositions are inferior in handling property. Accordingly, it is difficult to produce films which can stand processing such as printing or lamination and which are free from wrinkles.

In terms of continuous processability in processing of a foodstuff packing material, a barrier film excellent in easily slidable property has been required, and also in terms of foreign matter detection in product inspection after foodstuff packing and of a designing property required by consumers, a barrier film highly satisfying both of easily slidable property and transparency has been demanded.

A packing material has been demanded which is excellent in continuous productivity in post-processing such as printing or lamination, can be continuously processed by roll-to-roll, and satisfies air-tightness for foodstuffs, pharmaceutical products, electronic components, etc.

In addition, due to environmental awareness, demands for made of biomass-derived raw materials have been increasing.

The present invention is to provide a layered polyester film comprising a polyester film having a furandicarboxylic acid unit derived from biomass and a covering layer and usable for industrial and packing applications, wherein the layered polyester film has excellent mechanical properties, transparency, heat resistance, and a gas barrier property as well as has excellent easily slidable property. The present invention is to provide a film roll obtained by winding this layered polyester film.

Solution to Problem

Specifically, the film of the present invention is (1) a layered polyester film comprising a polyester film and a covering layer, wherein the polyester film is a biaxially oriented polyester film including a dicarboxylic acid component containing mainly a furandicarboxylic acid and a glycol component containing mainly ethylene glycol, the covering layer is formed on at least one surface of the polyester film, and the layered polyester film has a plane orientation coefficient ΔP of not less than 0.005 and not more than 0.200, and a thickness of the layered polyester film is not thinner than 1 μm and not thicker than 300 μm.

(2) The layered polyester film according to (1), wherein the layered polyester film preferably has an oxygen permeability of not less than 0.1 mL/m$^2$/day/MPa and not more than 1000 mL/m$^2$/day/MPa under a temperature of 23° C. and a humidity of 65%.

(3) The layered polyester film according to (1) or (2), wherein the covering layer preferably contains at least one kind resin selected from a polyester-based resin, a urethane-based resin, and an acrylic resin.

(4) The layered polyester film according to any one of (1) to (3), wherein the covering layer preferably further contains inorganic particles.

(5) The layered polyester film according to any one of (1) to (4), wherein the layered polyester film preferably has a coefficient of static friction (μs) of not more than 1.0 and a coefficient of dynamic friction (μd) of not more than 1.0.

(6) The layered polyester film according to any one of (1) to (5), wherein the layered polyester film has a heat shrinkage rate of not less than. 0.01% and not more than 30% when heated at 150° C. for 30 minutes.

(7) The layered polyester film according to any one of (1) to (5), wherein the layered polyester film has a heat shrinkage rate of not less than 0.01% and not more than 20% when heated at 150° C. for 30 minutes.

(8) The layered polyester film according to any one of (1) to (5), wherein the layered polyester film has a heat shrinkage rate of not less than 0.01% and not more than 10% when heated at 150° C. for 30 minutes.

(9) The layered polyester film according to any one of (1) to (8), wherein the layered polyester film has a plane orientation coefficient ΔP of not less than 0.100 and not more than 0.200.

(10) In addition, the present invention encompasses a polyester film roll obtained by winding the layered polyester film according to any one of (1) to (9).

Advantageous Effects of Invention

The layered polyester film comprising a polyester film having a furandicarboxylic acid unit can be used preferably as industrial and packing films since the layered polyester film has excellent mechanical properties, transparency and heat, resistance. According to further preferable embodiments, the present invention can provide a packing material or a gas shielding material which is excellent in continuous productivity in post-processing such as printing or lamination, can be processed by roll-to-roll, and satisfies air tightness for foodstuffs, pharmaceutical products, electronic components, etc.

DESCRIPTION OF EMBODIMENTS

The layered polyester film of the present invention includes a polyester film and a covering layer, and this covering layer is formed on at least one surface of the polyester film. A thin film layer may be laid onto at least one surface of this covering-layer-layered polyester film.

<Polyester Film>

The polyester film used in the present invention is a biaxially oriented polyester film including a polyethylene furandicarboxylate resin containing mainly furandicarboxylic acid as a dicarboxylic acid component, and containing mainly ethylene glycol as a glycol component. The polyethylene furandicarboxylate resin contains, as main constituent components thereof, ethylene glycol and furandicarboxylic acid. The word "mainly" means that the furandicarboxylic acid is 80% or more by mole in 100% by mole of the whole dicarboxylic acid component(s), and the ethylene glycol is 80% or more by mole in 100 mol % of the whole glycol component(s).

As far as the object of the present invention is not hindered, a different dicarboxylic acid component and a different glycol component may be copolymerized with the main constituent components. The copolymerization amount proportion of the different dicarboxylic acid and that of the different glycol component are each less than 20% by mole, preferably 10% or less by mole, in particular preferably 5% or less in 100 mol % of the entire dicarboxylic acid components or the entire glycol components.

Examples of the different dicarboxylic acid component include aromatic dicarboxylic acids such as terephthalic acid, isophthalic acid, phthalic acid, naphthalene dicarboxylic acid, 4,4'-dicarboxybiphenyl, and sodium 5-sulfoisophthalic acid; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahplrophthalic acid; and aliphatic dicarboxylic acids such as oxalic acid, malonic acid, succinic acid, adipic acid, azelaic acid, sebacic acid, undecanoic diacid, dodecanoic diacid, octadecanoic diacid, fumaric acid, maleic acid, itaconic acid, mesa conic acid, citraconic acid, and dimer acid.

Examples of the different glycol component include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricydodecane, diethylene glycol, and triethylene glycol; alicyclic glycols such as bisphenol A, bisphenol S, bisphenol C, bisphenol. Z, bisphenol AP, any ethylene oxide adduct or propylene oxide adduct of 4,4'-biphenol; alicyclic glycols such as 1,2-cyclohexanedimethanol, 1,3-cyclohexanedimethanol and 1,4-cyclohexanedimethanol; and polyethylene glycol and polypropylene glycol.

The method for polymerization into such a polyethylene furandicarboxylate resin may be any production method, such as a direct polymerization method of causing furandicarboxylic acid and, if necessary, the different dicarboxylic acid to react with ethylene glycol and, if necessary, the different glycol component; or an interesterification method of causing a dimethyl ester of furandicarboxylic acid (and, if necessary, a methyl ester of the different dicarboxylic acid) and ethylene glycol (and, if necessary, the different glycol component) to undergo an interesterification reaction.

The polyester film used in the present invention may contain, as a resin component thereof, a different resin such as polyamide, polystyrene, polyolefin, or a polyester other than the above-mentioned polyester. From the viewpoint of mechanical properties and the heat resistance of the polyester film, the content of the different resin is preferably 30% or less by mass, more preferably 20% or less by mass, even more preferably 10% or less by mass, particular preferably 5% or less of the entire resin component(s) of the polyester film. The content is most preferably 0% (the entire resin component(s) of the polyester film is/are substantially the polyethylene furandicarboxylate resin).

The intrinsic viscosity of the polyethylene furandicarboxylate resin is preferably from 0.30 dL/g to 1.20 dL/g, more preferably from 0.55 dL/g to 1.00 dL/g, even more preferably from 0.70 dL/g to 0.95 dL/g. If the intrinsic viscosity is lower than 0.30 dL/g, the polyester film is easily torn. If the intrinsic viscosity is higher than 1.20 dL/g, pressure for the filtration of the resin rises so that the resin is not filtrated with a high precision, and is not easily extruded through a filter.

The intrinsic viscosity of the resin of the polyester film is preferably from 0.30 dL/g to 1.20 dL/g, more preferably from 0.55 dL/g to 1.00 dL/g, even more preferably from 0.70 dL/g to 0.95 dL/g. If the intrinsic viscosity is lower than 0.30 dL/g, the polyester film is easily torn. If the intrinsic viscosity is higher than 1.20 dL/g, an effect of heightening the film in mechanical properties is saturated.

<Coating Layer>

The coating layer is formed onto at least one surface of the polyester film. The coating layer in may be formed onto each of the two surfaces thereof. The polyester film may have a multilayer-layered structure in which the coating layer further has, thereon, a coating layer. In order that the film can attain consistency between a high transparency and an excellent slipping-property, it is important to form the former coating layer. When this coating layer has plural layers, it is preferred to incorporate inorganic particles that will be detailed later into outermore one of the plural layers (at a side of the layered polyester film that is opposite to the polyester-film-side thereof).

The coating layer preferably contains at least one resin selected from any polyester resin, urethane resin, and acrylic resin. The polyester resin, acrylic resin or urethane resin constituting the coating layer in the present invention has adhesiveness onto the polyester film. These resins may be used singly, or the different resins may be used in any combination of two or more thereof, such as a combination of the polyester and urethane resins, the polyester and acrylic resins, or the urethane and acrylic resins.

Polyester Resin:

When copolymerized polyester is used as the polyester resin, it is preferred to use one or more aromatic dicarboxylic acid components and further use, as glycol components thereof, ethylene glycol and a branched glycol. Examples of the branched glycol include 2,2-dimethyl-1,3-propanediol (neopentyl glycol), 2-methyl-2-ethyl-1,3-propanediol, 2-1 ethyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 1,3-propanediol, 2-n-butyl-2-propyl-1,3-propanediol, and 2,2-di-n-hexyl-1,3-propanediol.

The lower limit of the molar ratio of the branched glycol component to the entire glycol component(s) is preferably 10% by mole, more preferably 20% by mole, even more preferably 30% by mole. The upper limit thereof is preferably 90%, by mole, more preferably 80% by mole. If necessary, for example, the following may be together used: diethylene glycol, propylene glycol, butanediol, hexanediol, or 1,4-cyclohexanedimethanol.

The aromatic dicarboxylic acid component(s) is/are most preferably terephthalic acid, isophthalic acid or furandicarboxylic acid. The aromatic dicarboxylic acid component(s) may be made only of terephthalic acid, isophthalic acid or furandicarboxylic acid. It is allowable to add, thereto, a different aromatic dicarboxylic acid, particularly, an aromatic dicarboxylic acid such as diphenylcarboxylic acid or 2,6-naphthalene dicarboxylic acid in a proportion of 10% or less by mole of the entire dicarboxylic acids, and then copolymerize the resultant with the component(s) concerned.

When the polyester resin is used as an aqueous paint, a water soluble or water dispersible polyester resin is used. For the solubilization or dispersibility into water, it is preferred to copolymerize a compound having a sulfonate group or a compound having a carbonate group with the compound(s) concerned. It is preferred therefor to use, besides the dicarboxylic acid component(s), for example, sulfoterephthalic acid, 5-sulfoisophthalic acid, 4-sulfonaphthaleneisophthalic acid-2,7-dicarboxylic acid or 5-(4-sulfophenoxy)isophthalic acid, or an alkali metal salt thereof in a proportion ranging from 1 to 10% by mole of the entire dicarboxylic acids in order to give water dispersibility to the polyester. It is more preferred to use 5-sulfoisophthalic acid, or an alkali metal salt thereof.

Polyurethane Resin:

The polyurethane resin used in the present invention contains, as constituent components, at least a polyol component and a polyisocyanate component, and may optionally further contain a chain extender. When a thermal reactive type polyurethane resin is used, the resin is, for example, a water soluble or water dispersible polyurethane in which terminated isocyanate groups are blocked with active hydrogen.

Examples of the polyol component include polyester polyols each obtained by a reaction of a polybasic carboxylic acid (such as malonic acid, succinic acid, adipic acid, sebacic acid, fumaric acid, maleic acid, terephthalic acid, or isophthalic acid), or an acid anhydride of the acid, and a polyhydric alcohol (such as ethylene glycol, diethhylene glycol, triethylene propylene glycol, butanediol, 1,3-butanediol, 1,4-butanediol, 2,3-butanediol, neopentyl glycol, or 1,6-hexanediol); polyether polyols such as polyethylene glycol, polypropylene glycol, polyethylene propylene glycol, polytetramethylene glycol ether glycol and polyhexamethylene ether glycol; and polycarbonate polyols, polyolefin polyols and acrylic polyols.

Examples of the polyisocyanate, which is a constituent component for the urethane resin in the present invention, include aromatic diisocyanates such as tolylene diisocyanate, diphenylmethane-4,4-diisocyanate; araliphatic diisocyanates such as xylylene diisocyanate; alicyclic diisocyanates such as isophorone diisocyanate, 4,4-dicyclohexylmethane diisocyanate, and 1,3-bis(isocyanatomethyl)cyclohexane; aliphatic diisocyanates such as hexamethylene diisocyanate, and 2,2,4-trimethylhexamethylene diisocyanate; and polyisocyanates each obtained by adding one or more of these compounds beforehand to, for example, trimethylolpropane. From the viewpoint of the barrier performance of the film, preferred are aromatic diisocyanates, araliphatic diisocyanates, and alicyclic diisocyanates. When their cyclic moiety has a substituent, any side chain of their aromatic ring or aliphatic ring is preferably a short chain. It is more preferred that the diisocyanate components are each symmetric since the components are improved in cohesive power.

Examples of an agent for the above-mentioned isocyanate-group-blocking include bisulfites, phenols, alcohols, lactams, oximes, esters such as dimethyl malonate, diketones such as methyl acetoacetate, mercaptans, ureas, imidazoles, acid imides such as succinic imide, amine such as diphenylamine, imines, and carbamates such as 2-oxazolidine. The water soluble or water dispersible polyurethane preferably has, in the molecule thereof, a hydrophilic group. It is preferred therefor that a compound to be used which has, in the molecule thereof, at least one active hydrogen atom has a hydrophilic group, or that a hydrophilic compound is used as the above-mentioned blocking agent. The compound to be used, which has in the molecule thereof at least one active hydrogen atom, is, for example, taurine, dimethylolpropionic acid, a polyester polyol having a carboxylate group or sulfonate group, or a polyoxyalkylene polyol. The hydrophilic compound as the blocking agent is, for example, a bisulfite, or a phenol having a sulfonate group. When thermal energy is given to the above-mentioned resin in a drying or thermally setting step in the production of the film, the blocking agent is released from the isocyanate groups. Thus, about the resin, the water dispersible copolymerized polyester resin is fixed into a self-crosslinked network of the resin; and further the isocyanate groups react with terminal groups of the resin. The water soluble or water dispersible polyurethane is in particular preferably a polyurethane for which a hydrophilic compound is used as the blocking agent. Such a polyurethane is poor in water resistance since the resin is hydrophilic while the resin is being prepared into a liquid paint. However, when the polyurethane is painted, dried and thermally set to finish the thermal reaction thereof, hydrophilic groups of the urethane resin, that is, the blocking agent is released to give a paint film good in water resistance.

A chemical composition of a urethane prepolymer used in the above-mentioned polyurethane resin is a compound which has a terminal isocyanate group and which is obtained by causing the following (1), (2) and (3) react with each other: (1) a compound having, in the molecule thereof, at least two reactive hydrogen atoms, and having a molecular weight of 200 to 20,000; (2) an organic polyisocyanate having, in the molecule thereof, two or more isocyanate groups; and (3) a chain extender having, in the molecule thereof, at least two active hydrogen atoms, this extender being optionally incorporated into this composition.

A generally known example of the compound (1) having, in the molecule thereof, at least reactive hydrogen atoms, and having a molecular weight of 200 to 20,000 is a compound containing, in a terminal or the molecule thereof, two or more hydroxyl, carboxyl, amino or mercapto groups. A particularly preferred example thereof is a poly ether polyol or a polyester polyol.

The polyester polyol can be obtained by condensing a polybasic saturated or unsaturated carboxylic acid such as succinic acid, adipic acid, phthalic acid or maleic anhydride, or an anhydride of the carboxylic acid with a polyhydric saturated or unsaturated alcohol such as ethylene glycol, diethylene glycol, 1,4-butanediol, neopentyl glycol, 1,6-hexanediol or trimethylolpropane, or a polyalkylene ether glycol such as polyethylene glycol or polypropylene glycol relatively low in molecular weight, or any mixture of two or more of these alcohols.

Furthermore, for example, the following may be used as the polyester polyol: any polyester obtained from a lactone and a hydroxy acid; or any polyester polyol obtained by adding, for example, ethylene oxide or propylene oxide to a polyester produced in advance.

Examples of the organic polyisocyanate (2) include isomers of toluylene diisocyanate, aromatic diisocyanates such as 4,4-diphenylmethane diisocyanate, araliphatic diisocyanates such as xylylene diisocyanate, alicyclic diisocyanates such as isophorone diisocyanate, and 4,4-dicyclohexylmethane diisocyanate, aliphatic diisocyanates such as hexamethylene diisocyanate, and 2,2,4-trimethylhexamethylene diisocyanate; and polyisocyanates each obtained by adding one or more of these compounds to, for example, trimethylolpropane.

Examples of the chain extender (3) having, in the molecule thereof, at least two active hydrogen atoms include glycols such as ethylene glycol, diethylene glycol, 1,4-butanediol, and 1,6-hexanediol; polyhydric glycols such as glycerin, trimethylolpropane, and pentaerythritol; diamines such as ethylenediamine, hexamethylenediamine, and piperazine; amine alcohols such as monoethanolamine, and diethanolamine; thiodiglycols such as thiodiethylene glycol; and water.

In order to synthesize the urethane prepolymer, usually, by a mono-step or multi-step isocyanate polyaddition method using the compounds (1) and (2) and, if necessary, the compound (3), these compounds are caused to react with each other at 150° C. or lower, preferably a temperature from 70 to 120° C. for a period of 5 minutes to several hours. The ratio of the isocyanate groups of the compound (2) to the active hydrogen atoms of the compounds (1) and (3) may be selected at will as far as the ratio is 1 or more. It is however necessary that free isocyanate groups remain in the resultant, urethane prepolymer. Furthermore, it is sufficient for the content of the free isocyanate groups to be 10% or less by mass of the total of the resultant urethane prepolymer. Considering the stability of an aqueous solution of the urethane prepolymer after the prepolymer is blocked, the ratio is preferably 7% or less by mass.

About the resultant prepolymer, terminal isocyanate groups thereof are blocked preferably with a bisulfite. The urethane prepolymeris mixed with an aqueous solution of the bisulfite. Reaction therebetween is advanced while the mixture is sufficiently stirred for a period of about 5 minutes to 1 hour. The reaction temperature is preferably 60° C. or lower. Thereafter, the reaction mixture is diluted with water to be made into an appropriate concentration to prepare a thermally reactive type water soluble urethane resin composition. This composition is adjusted into an appropriate concentration and viscosity when used. When the composition is heated into a temperature of about 80 to 200° C., the bisulfite, which is the blocking agent, is usually disassociated to reproduce active terminal isocyanate groups; thus, the composition comes to have a property that a polyurethane polymer is produced or the isocyanate groups are added to other functional groups by a polyaddition reaction caused in any one of the molecules or between the molecules of the prepolymer.

Acrylic Resin:

When the acrylic resin is used, water soluble or water dispersible examples of the acrylic resin include acrylate resin; methacrylate resin; and copolymers each made from one or two of these resins, and styrene or any other aliphatic compound or aromatic compound which has an unsaturated bond and is copolymerizable with acrylic resin. An acryl-styrene copolymer resin excellent in hydrophilicity is most preferably a water dispersible acryl-styrene random copolymer resin obtained by emulsion polymerization.

Inorganic Particles:

In order to improve the layered polyester film in scratch resistance, and in handleabilities when the film is wound up into a roll form (such as slipping-property, runnability, blocking resistance, and air-releasing property of accompanying air at the time of the winding), it is preferred to incorporate inorganic particles into the coating layer. The incorporation makes it possible that the layered polyester film of the present invention gains slipping-property, windability, and scratch resistance while keeping a high transparency.

The inorganic particles are, for example, calcium carbonate, calcium phosphate, amorphous silica, crystalline glass filler, kaolin, talc, titanium dioxide, alumina, silica-alumina multi-oxide particles, barium sulfate, calcium fluoride, lithium fluoride, zeolite, molybdenum sulfide, or mica inorganic particles; or heat resistant polymeric particle, such as crosslinked polystyrene particles, crosslinked acrylic resin particles, crosslinked methyl methacrylate particles, benzoguanamine/formaldehyde condensed product particles, melamine/formaldehyde condensed product particles, or polytetrafluoroethylene particles.

Out of these particles, silica particles are preferred since the particles are relatively close in refractive index to the resin component(s) to give a highly transparent film easily. The shape of the particles is not particularly limited, and is preferably substantially spherical from the viewpoint of the supply of high-slipping-property.

The content of the particles in the entire amount of the coating layer is preferably 20% or less by mass, more preferably 15% or less by mass, in particular preferably 10% or less by mass. If the content of the particles in the coating layer is more than 20% by mass, the film is deteriorated in transparency and also becomes insufficient in adhesiveness easily. The lower limit of the content of the particles is preferably 0.1% by mass, more preferably 1% by mass, in particular preferably 3% by mass.

When the particles are of a single species, or two or more species, the average particle diameter of main particles P thereof is preferably from 10 to 10000 nm, in particular preferably from 200 to 10000 nm. If the average particle diameter of the particles P is less than 100 nm, the layered polyester film may be deteriorated in scratch resistance, slipping-property, and windability. If the average particle diameter of the particles P is more than 10000 nm, the particles drop down easily and further the film tends to be raised in haze. When two or more particle species are used and, as one thereof, particles Q small in average particle diameter are added to the coating layer, the average particle diameter of the particles is preferably from 20 to 150 nm, more preferably from 40 to 60 nm. If the average particle diameter is less than 20 nm, the film cannot easily obtain a sufficient blocking resistance, and further the film tends to be deteriorated in scratch resistance.

When the particles are silica particles P, it is preferred that the average particle diameter of the particles P is from 10 to 10000 nm since aggregates which are made of silica produced by a drying method and which have an average primary particle diameter of 40 to 60 nm do not drop easily from the coating layer. This would be because in the process for forming the film, the particles can be made into a flat and stable form through a stretching step and a heat fixation step after painting into a high-slipping-property modifying layer of the film. From the viewpoint of the scratch resistance of the film, the particles P are preferably particles about which the following ratio is 4 or more: the ratio of the average particle diameter in a particle-aggregating state to the average primary particle diameter ("the average particle diameter in the aggregating state"/"the average primary particle diameter").

About the particles, two or more different particle species may be incorporated into the coating layer, or the same particle species having different average particle diameters may be incorporated thereinto.

A surfactant may be incorporated into the coating layer to improve the leveling property of a coating liquid for the layer when the liquid is painted, or to de-foam the coating liquid. The surfactant may be any one of cationic, anionic, nonionic and other surfactants. The surfactant is preferably a silicone type, acetylene glycol type, or fluorine-containing type surfactant. It is preferred to incorporate such a surfactant into the coating liquid for forming the coating layer, to an extent such that adhesiveness is not damaged between the coating layer and the polyester film, in a proportion ranging, for example, from 0.005 to 0.5% by mass of the coating liquid.

In order to give a different function to the coating layer, various additives may be added thereto. Examples of the additives include a fluorescent dye, a fluorescent whitener, a plasticizer, an ultraviolet absorbent, a pigment disperser, a foam-restraining agent, an anti-foaming agent, a preservative, and an antistatic agent.

A method in the present invention for forming the coating layer onto the polyester film is, for example, a method of painting, onto the polyester film, a coating liquid, for forming the coating layer, containing a solvent and the above-defined particles and resin(s), and then drying the painted liquid. The solvent is, for example, an organic solvent such as toluene, water, or a mixed solvent of water and a water soluble organic solvent, and is preferably water alone, or a mixed solvent of water and a water soluble organic solvent from the viewpoint of environmental issues.

<Thin Film Layer>

The thin film layer used in the present invention contains, as a main component, an inorganic compound. The inorganic compound is at least one of aluminum oxide and silicon oxide. The wording "main component" herein denotes that, the proportion of the total of aluminum oxide and silicon oxide is more than 50% by mass of the components constituting the thin layer, preferably 70% or more by mass thereof, more preferably 90% or more by mass thereof. Most preferably, the proportion is 100% by mass thereof (no component other than aluminum oxide and silicon oxide is contained as one thin-film-layer-constituent component). Aluminum oxide referred to herein is made of at least one of various aluminum oxide species such as AlO, $Al_2O$ and $Al_2O_3$. The respective contents by percentage of the various aluminum oxide species are adjustable in accordance with production conditions of the thin film layer. Silicon oxide referred to herein is made of at least one of various silicon oxide species such as SiO, $Si_2O$ and $Si_2O_3$. The respective contents by percentage of the various silicon oxide species are adjustable in accordance with the production conditions of the thin film layer. As far as properties of the thin film layer are not damaged, aluminum oxide or silicon oxide may contain any other component in a trace proportion (up to at most 3% by mass of the entire components).

The thickness of the thin film layer is not particularly limited, and is preferably from 5 to 500 nm, more preferably from 10 to 200 nm, even more preferably from 15 to 50 nm from the viewpoint of the gas barrier performance and the flexibility of the film. If the film thickness of the thin film layer is less than 5 nm, it is feared that the film does not easily gain a satisfactory gas barrier performance. If the thickness is more than 500 nm, the film cannot gain a gas-barrier-performance-improving effect corresponding to the thickness. Thus, a disadvantage is reversely produced from the viewpoint of the flexing resistance of the film, and production costs.

<Physical Properties of Layered Polyester Film>

About the layered polyester film of the present invention, the plane orientation coefficient (ΔP) thereof is from 0.005 and not more than 0.200, preferably not less than 0.020 and not more than 0.195, more preferably not less than 0.100 and not more than 0.195, even more preferably not less than 0.110 and not more than 0.195, still more preferably not less than 0.120 and not more than 0.195, even still more preferably not less than 0.130 and not more than 0.190, further more preferably not less than 0.135 and not more than 0.180, especially preferably not less than 0.140 and not more than 0.170, and most preferably not less than 0.145 and not more than 0.160. If the plane orientation coefficient (ΔP) is less than 0.005, for example, the following are unfavorably caused: the film becomes insufficient in mechanical properties, and is not easily processed by a post-processing such as printing or a processing into a bag; and the film is broken on a printer or a coater when subsequently subjected to the printing, or coating. About the plane orientation coefficient of any film, in accordance with JIS K 7142-1996 5.1 (method A), a sodium D line is used as a light source to measure the in-plane refractive index (nx) of the film in the mechanical direction (MD direction thereof, the in-plane refractive index (ny) thereof in a direction (TD direction) perpendicular thereto, and the refractive index (nz) thereof in the thickness direction through an Abbe refractometer. The plane orientation coefficient (ΔP) can then be calculated out in accordance with the following equation:

$$\Delta P = \{(nx+ny)-2nz\}/2$$

When a film has, on both surfaces thereof, thin film layers, respectively, the coefficient is measurable by the same method.

About the layered polyester film of the present invention, the heat shrinkage rate thereof when the film is heated at 150° C. for 30 minutes (hereinafter referred to merely as the heat shrinkage rate) is preferably 50% or less, more preferably 30% or less, even more preferably 20% or less, even more preferably 10% or less, in particular preferably 8% or less, most preferably 4.5% or less in each of the MD direction and the TD direction. If the heat shrinkage rate is large, a color shift is generated when a print is made onto the film or the film is elongated on a printer or a coater not to attain the printing or coating easily; and further the film is deformed by high-temperature heat, so as to give a poor appearance or undergo other inconveniences. It is preferred to make the heat shrinkage rate low. However, the lower limit thereof would be 0.01% from the viewpoint of the production of the film.

In the present invention, at a temperature of 23° C. and a humidity of 65%, the oxygen permeability of the layered polyester film is preferably from 0.1 $mL/m^2/day/MPa$ to 1000 $mL/m^2/day/MPa$, more preferably from 0.1 $mL/m^2/day/MPa$ to 200 $mL/m^2/day/MPa$, even more preferably from 0.1 $mL/m^2/day/MPa$ to 100 $mL/m^2/day/MPa$, even more preferably from 0.1 $mL/m^2/day/MPa$ to 80 $mL/m^2/day/MPa$, in particular preferably from 0.1 $mL/m^2/day/MPa$ to 10 $mL/m^2/day/MPa$. If the oxygen permeability is more than 1000 $mL/m^2/day/MPa$, oxygen penetrating into the film may unfavorably deteriorate the storage state of the material or the food. The lower limit of the oxygen permeability would be 0.1 $mL/m^2/day/MPa$ from the viewpoint of the film production.

The oxygen permeability can be further improved by using, for example, a method of applying printing or coating onto the film, or a coextruding method.

In the present invention, at a temperature of 37.8° C. and a humidity of 90%, the water vapor permeability of the layered polyester film is preferably 0.1 $g/m^2/day$ or more, and 40 $g/m^2/day$ or less, more preferably 30 $g/m^2/day$ or less, even more preferably 20 $g/m^2/day$ or less. If the water vapor permeability is more than 40 $g/m^2/day$, water vapor penetrating into the film may unfavorably deteriorate the storage state of the material or the food. The lower limit of the water vapor permeability would be 0.1 $g/m^2/day$ from the viewpoint of the film production. The water vapor permeability can be further improved by using, for example, a method of applying printing or coating onto the film, or a coextruding method.

About the layered polyester film of the present invention, the polyester itself, which has a furandicarboxylic acid unit, has a property of a high oxygen barrier performance (low oxygen permeability). The oxygen barrier performance is made better by rendering the film a polyester film satisfying a stretching step that will be detailed later, or causing the film to have a thin film layer made mainly of an inorganic compound.

About the layered polyester film, the in-plane refractive index (nx) thereof in the MD direction and that (ny) in an in-plane direction perpendicular thereto (TD direction) are each preferably 1.5700 or more, more preferably 1.6000 or more, even more preferably 1.6200 or more. By setting each of nx and ny to 1.5700 or more, the film can gain a sufficient breaking strength and breaking elongation to become sufficient in mechanical properties. Favorably, therefore, for example, the film is easily subjected to a post-processing, such as printing or forming into a bag, and the film is not easily broken onto a printer or coater at, the time of the subsequent printing, or coating. The value of each of nx and ny is preferably less than 1.7000 from the viewpoint of the production and the heat shrinkage rate of the film.

About the layered polyester film of the present invention, the breaking strength in each of the MD direction and the TD direction is preferably 75 MPa or more. The lower limit of the breaking strength is preferably 100 MPa, more preferably 150 MPa, even more preferably 200 MPa, even more preferably 220 MPa. If the breaking strength is less than 75 MPa, the film is insufficient in mechanical strength to be elongated in the step of processing the film, so that the film unfavorably undergoes a shift, out of position or other inconveniences easily. Considering the film production, the upper limit of the breaking strength is 1000 MPa.

About the layered polyester film of the present invention, the breaking elongation in each of the MD direction and the TD direction is preferably 100% or more. The lower limit of the breaking elongation is preferably 15%, more preferably 20%, in particular preferably 30%. If the breaking elongation is less than 10%, the film is insufficient in mechanical elongation to be unfavorably cracked, broken or damaged into some other inconvenient form in the step of processing the film. Considering the film production, the upper limit of the breaking elongation is preferably 150%, more preferably 100%, even more preferably 80%.

About the layered polyester film of the present invention, it is preferred that the coefficient ($\mu s$) of static friction is 1.0 or less, and the coefficient ($\mu d$) of dynamic friction is 1.0 or less. The static friction coefficient ($\mu s$) is more preferably 0.8 or less, even more preferably 0.6 or less. The dynamic friction coefficient ($\mu d$) is more preferably 0.8 or less, even more preferably 0.6 or less. If the static friction coefficient ($\mu s$) or the dynamic friction coefficient ($\mu d$) is more than 1.0, the film is deteriorated in high-slipping-property to be unfavorably scratched or wrinkled by friction when running. The static friction coefficient ($\mu s$) is the static friction coefficient ($\mu s$) between one of the surfaces of the layered polyester film of the present invention and the other surface. The dynamic friction coefficient ($\mu d$) is the dynamic friction coefficient ($\mu d$) between one of the surfaces of the layered polyester film of the present invention and the other surface.

About the layered polyester film of the present invention, the total ray transmittance is preferably 75% or more. The film is desirably high in transparency to improve a precision with which an internal foreign matter, which is a defect of the film, is detectable. For the high transparency, the total ray transmittance of the layered polyester film of the present invention is preferably 75% or more, more preferably 80% or more, even more preferably 88.5% or more, in particular preferably 89% or more. In order to improve the precision, with which an internal foreign matter as a defect of the film is detectable, it Is more preferred that the total light transmittance is higher. It is however technically difficult to attain a total light transmittance of 100%.

About the layered polyester film of the present invention, the haze is preferably 15% or less. In order that when the film is used for food-packing, a defect of a content therein can be detected, it is desired that the film becomes less cloudy. It is preferred therefor that the haze of the layered polyester film of the invention is 15% or less. The haze is more preferably 8% or less, even more preferably 3% or less, in particular preferably 1% or less. It is more preferred that the haze is lower. However, the lower limit thereof would be 0.1% from the viewpoint of the intrinsic refractive index of the polyester film.

The thickness of the layered polyester film of the present invention is from 1 μm to 300 μm, preferably from 5 μm to 200 μm, more preferably from 10 μm to 100 μm, in particular preferably from 10 μm to 40 μm. If the thickness is more than 300 μm, a problem is caused against costs, and the film is easily lowered in content-perceptible property when used as a packing material. If the thickness is less than 1 μm, the film is lowered in mechanical properties not to fulfil a function thereof unfavorably.

When the layered polyester film of the present invention is wound into a roll form, the winding length and width thereof are appropriately determined in accordance with the usage of the film roll. The winding length of the film roll is preferably 100 in or more, more preferably 1000 in or more. The width of the film roll is preferably 200 mm or more, more preferably 1000 mm or more.

A method for producing the layered polyester film of the present invention will be described. About a typical example thereof in which PET pellets are used, a detailed description will be made. Naturally, however, the method is not limited to this example.

Initially, raw materials of the film are dried, or dried with hot wind to have a water content less than 200 ppm. Next, the raw materials are each weighed. The weighed materials are mixed with each other, and the mixture is supplied into an extruder to be melted and extruded into a sheet form. Furthermore, a static electricity applying method is used to cause the melted sheet to adhere closely to a rotary metal roll (casting roll), and cooled and solidified to yield an unstretched PEF sheet.

At any site where the melted resin is kept at a temperature of 220 to 280° C., the resin may be subjected to high-precision filtration to remove foreign matters contained in the resin. A filter material used for the high-precision filtration of the melted resin is not particularly limited. When the filter material is a sintered stainless steel, this material is preferable since the material is excellent in performance of removing aggregates made mainly of Si, Ti, Sb, Ge and C, and high-melting-point organic materials.

In the case of coextruding a surface layer (layer "a") and an intermediate layer (layer "b") to be layered onto each other, two or more extruders are used to extrude respective raw materials for the layers, and then a multilayer feed block (for example, a confluent block having a rectangular confluent moiety) is used to join the two layers with each other. The joined layer is extruded through a slit-form die into a sheet from. The sheet is cooled and solidified onto a casting roll to produce an unstretched film. Alternatively; instead of the multilayer feed block, a multi-manifold die may be used.

Next, the unstretched film yielded by the above-mentioned method is biaxially stretched, and then thermally treated.

When a biaxially stretched polyester film having a furandicarboxylic acid unit is produced, for example, the following may be adopted: a successively biaxial-stretching method of stretching an unstretched film therefor monoaxially into the MD direction or TD direction thereof, and next stretching the resultant into a direction orthogonal thereto; a simultaneously biaxial-stretching method of stretching an unstretched film therefor simultaneously into the MD method and the TD direction; or a method of using a linear motor as a driving means when the simultaneously biaxial-stretching is performed. In the case of the successively biaxial-stretching method, the method can be attained by using a heating roll for the MD stretching to stretch the MD-unstretched film into the MD direction with a stretching-speed difference. For the heating, for example, an infrared heater may be together used. The subsequent TD stretching can be attained by leading the MD stretched sheet into a tenter, grasping both ends thereof with clips, and then stretching the sheet into the TD direction while the sheet is heated. The TD-stretched film is subsequently thermally treated in the tenter. The thermal treatment may be conducted in the state of stretching the film by the TD stretching. The treatment may be conducted while the film is relaxed into the TD direction. About the thermally treated film, it is allowable to cut down both ends thereof, and wind up the film through a winder.

Patent Literatures 5 and 6 disclose a method for producing a PEF/PEF-derivative film stretched monoaxially at a stretching ratio of 1.6 to 16. However, the disclosed method makes it impossible that the film attains mechanical properties usable for industries and packages. Thus, the present inventors have made eager researches to cause a film to attain high mechanical properties by performing stretching-manners (i) to (vii) described below. Moreover, the film can attain a high barrier performance by forming a thin film layer as descried in item (viii) described below.

(i) Control of Stretching Ratio of Film in MD Direction

In order to yield a polyester film used in the present invention, it is desired to stretch an MD-unstretched film therefor at a stretching ratio ranging from 1.1 to 10.0 into the MD direction. By stretching the film at a stretching ratio of 1.1 or more (preferably 1.5 or more), a film can be produced which has a plane orientation coefficient ($\Delta P$) of 0.005 or more. The stretching ratio into the MD direction is preferably 2.5 or more, more preferably 3.5 or more, even more preferably 4.0 or more, in particular preferably 4.5 or more. By setting the ratio to 2.5 or more, a film excellent in mechanical properties can be produced in which $\Delta P$ is 0.02 or more, the refractive indexes nx and ny in the MD and the TD directions are each 1.5700 or more, the breaking strength is 100 MPa or more, and the breaking elongation is 15% or more. When the stretching ratio in the MD direction is 10.0 or less, the frequency of breaking of the film is favorably reduced. By heightening the stretching ratio in the MD direction to orient the molecular chains appropriately, the temperature for the heat fixation step of the film can be made high to lower the heat shrinkage rate of the film.

(ii) Control of Stretching Temperature of Film in MD Direction

In order to yield a polyester film used in the present invention, it is desired to stretch an MD-unstretched film therefor into the MD direction at a temperature ranging from 90° C. to 150° C. The temperature ranges more preferably from 100° C. to 125° C. When the stretching temperature in the MD direction is 90° C. or higher, the frequency of breaking of the film is favorably reduced. When the temperature is 150° C. or lower, the MD-unstretched film can be favorably stretched into an even state.

(iii) Control of Stretching ratio of Film in TD Direction

In order to yield a polyester film used in the present invention, it is desired to stretch a TD-unstretched film therefor at a stretching ratio of 1.1 to 10.0 into the TD direction. By TD-stretching the film at a stretching ratio of 1.1 or more (preferably 1.5 or more), a film can be produced which has a plane orientation coefficient ($\Delta P$) more than 0.005. The stretching ratio into the TD direction is preferably 3.0 or more, more preferably 3.5 or more, even more preferably 4.0 or more, in particular preferably 4.5 or more. By setting the stretching ratio to 3.0 or more into the TD direction, a film excellent in mechanical properties can be produced in which $\Delta P$ is 0.02 or more, the refractive indexes nx and ny in the MD and the TD directions are each 1.5700 or more, the breaking strength is 75 MPa or more, and the breaking elongation is 15% or more. When the stretching ratio in the TD direction is 10.0 or less, the frequency of breaking of the film is favorably reduced.

(iv) Control of Stretching Temperature in TD Direction.

In order to yield a polyester film used in the present invention, it is desired to stretch a TD-unstretched film therefor into the Ti direction at a temperature ranging from 80° C. to 200° C. The temperature ranges more preferably from 95° C. to 135° C. When the stretching temperature in the TD direction is 80° C. or higher, the frequency of breaking of the film is favorably reduced. When the temperature is 200° C. or lower, the unstretched film can be favorably stretched into an even state.

(v) Control of Heat Fixation Temperature of Film

In order to yield a polyester film used in the present invention, it is desired to subject a heat-unfixed film therefor to heat fixation treatment at a temperature ranging from 110° C. to 220° C. When the heat fixation temperature is 220° C. or lower (preferably 210° C. or lower), favorably, the film does not easily become opaque and the frequency of melting breaking thereof is reduced. By making the heat fixation temperature high, the film is favorably reduced in heat shrinkage rate. The temperature is more preferably 120° C. or higher, even more preferably 140° C. or higher, even more preferably 160° C. or higher, in particular preferably 175° C. or higher, most preferably 185° C. or higher. The heat fixation treatment tends to increase the plane orientation coefficient ($\Delta P$).

(vi) Control of Relaxation Temperature into TD Direction

In order to yield a polyester film used in the present invention, it is desired to subject a TD-unrelaxed film therefor to relaxation treatment into the TD direction at a temperature ranging from 100° C. to 200° C. The relaxation temperature in the TD direction is preferably from 165° C. to 195° C., more preferably from 175° C. to 195° C. This case can favorably make the heat shrinkage rate small.

(vii) Control of Relaxation Ratio in TD Direction

In order to yield a polyester film used in the present invention, it is desired to set the relaxation ratio of a TD-unrelaxed film therefor into the range of 0.5% to 10.0% in the TD direction. The relaxation ratio in the TD direction is preferably from 2% to 6%. This case can favorably make the heat shrinkage rate small.

(viii) Method for Producing Thin Film Layer

For producing the thin film layer, a known production method is appropriately used, examples thereof including PDV methods (physical vapor deposition methods) such as vacuum evaporation, sputtering, and ion plating methods; and CVD methods (chemical vapor deposition methods). The physical vapor deposition methods are preferred. The vacuum evaporation method is more preferred. In, for example, the vacuum evaporation, a mixture of $Al_2O_3$ and $SiO_2$, or a mixture of Al and $SiO_2$ is used as a vapor deposition material. A heating manner in the method may be, for example, resistance heating, high frequency induction heating, or electron beam heating. As a reactive gas for the method, for example, oxygen, nitrogen or water vapor may be introduced into a chamber for the method. Reactive vapor deposition may be used, using ozone addition, an ion assisting means or some other means. As far as the object of the present invention is not damaged, conditions for producing the thin film layer may be varied, for example, a bias voltage is added onto a used substrate, or the substrate is raised in temperature, or cooled. The same matters are applied to other production methods, for example, sputtering and CVD methods.

At any stage in a process for producing the layered polyester film, it is sufficient for the coating layer to be formed by applying a coating liquid for forming the coating layer onto at least one surface of a polyester film. It is preferred to form the coating layer by applying a coating liquid for forming the coating layer onto an unstretched or monoaxially stretched polyester film, drying the workpiece, stretching the dried film into at least one axial direction thereof, and next treating the film thermally.

The coating layer may be formed onto each of the two surfaces of the polyester film, or may be formed onto only one of the surfaces. It is preferred to form the coating layer onto one of the surfaces of the polyester film, and form a thin film layer onto the other surface. In the coating liquid for forming the coating layer, the solid content in the resin composition is preferably from 2 to 35% by mass, in particular preferably from 4 to 15% by mass.

The method for applying this coating liquid for forming the coating layer onto the film may be any known method. Examples thereof include reverse coating, graver coating, kiss coating, die coater, roll brushing, spray coating, air knife coating, wire bar coating, pipe doctor, impregnation coating, and curtain coating methods. The application is attained by using these methods singly or in any combination.

The thickness of the dried coating layer is preferably from 20 to 350 nm, and the application amount thereof is preferably from 0.02 to 0.5 g/m$^2$. If the application amount of the coating layer is less than 0.02 g/m$^2$, this layer hardly gives an advantageous effect for the adhesiveness. If the application amount is more than 0.5 g/m$^2$, the layered polyester film may be deteriorated in transparency.

The polyester film used in the present invention is a film produced by a polyester film producing method having a stretching step of stretching an unstretched film into the mechanical direction thereof, and a direction perpendicular thereto to produce a stretched film, and a relaxing step of relaxing the stretched film. The film producing method is not limited to the method disclosed specifically above as far as the method is within the scope of the above-mentioned technical idea. It is important for producing the film of the present invention to make highly precise controls about the above-mentioned production conditions on the basis of the technical idea.

About the polyester used in the present invention, the breaking strength, the breaking elongation and the beat shrinkage rate of the film are controllable in accordance with a combination of respective conditions for the above-mentioned stretching and thermal treatment, these conditions being each independently selected. These conditions are selected at will. Under preferred ones of the conditions, a film can be obtained which has a plane orientation coefficient ($\Delta P$) of 0.100 or more (preferably 0.140 or more), a heat shrinkage rate of 8% or less (preferably 4.5% or less), a film breaking strength of 150 MPa or more (preferably 250 MPa or more), and a breaking elongation of 40% or more by combining the items (i) to (vii) with each other.

In order to obtain a film having a heat shrinkage rate of 8% or less and a film breaking strength of 150 MP or more, it is effective, for example, to heighten the stretching ratio in the MD direction and that in the TD direction, and conduct the heat fixation treatment at a higher temperature. Specifically, a film can be obtained which has a film breaking strength of 150 MPa or more and a heat shrinkage rate of 8% or less by setting the stretching ratio in the MD direction and that in the TD direction to 4.0 or more (preferably 4.5 or more) and 4.0 or more (preferably 4.5 or more), respectively, and setting the temperature for the heat fixation treatment to 165° C. or higher.

When the produced stretched film is combined with a coating layer as described above, a layered polyester film can be produced which has a plane orientation coefficient ($\Delta P$) of 0.140 or more and an oxygen permeability of 0.1 to 100 mL/m$^2$/day/MPa at a temperature of 23° C. and a humidity of 65%.

During the stretching step for the present film, or after the end of the stretching, the film may be subjected to corona treatment or plasma treatment. When the film is coated with a liquid or dispersion liquid by obtained by mixing, for example, a resin, a crosslinking agent and particles appropriately with each other and dissolving the mixture in a solvent, it is also possible to give the film, for example, slipping-property, blocking resistance, antistatic property, and high adhesiveness. Various stabilizers, pigments, UV absorbents and others may be incorporated into the film of the present invention.

By subjecting the stretched and thermally treated film to surface treatment, functions thereof can be improved. The treatment is, for example, printing or coating.

The film after the completion of stretching and heat, treatment and the surface-treated film can be used for a packaging body, a label, a design sheet, or the like by laminating paper.

The present application claims the benefit of priority to Japanese Patent Application Number 2015-257296 filed on Dec. 28, 2015. The entire contents of the specifications of Japanese Patent Application Number 2015-257296 filed on Dec. 28, 2015 are hereby incorporated by reference.

EXAMPLES

Next, the effects of the present invention will be explained with reference to Examples and Comparative Examples. First, methods for evaluating property values used in the present invention will be described as follows. In (1) to (6) and (8) to (12), various physical properties were measured for layered polyester films in Examples and various physical properties were measured for polyester films in Comparative Examples.

(1) Breaking Strength and Breaking Elongation

Samples each in a strip form of 140 mm length and 10 mm width were cut out in the MD direction and TD direction of each film by a cutter. Next, each strip form sample was pulled by Autograph AG-IS (manufactured by Shimadzu Corporation) to measure the breaking strength (MPa) and the breaking elongation (%) in the respective directions from the load-strain curve obtained.

The measurement was performed under conditions of an atmosphere of 25° C., a chuck distance of 40 mm, a crosshead speed of 100 mm/minute, and a load cell of 1 kN. The measurement was repeated 5 times and the estimation was done using the average value thereof.

(2) Plane Orientation Coefficient ($\Delta P$)

The plane orientation coefficient was calculated as follows: the refractive index ($nx$) in the Mn direction of the film plane as well as the refractive index ($ny$) in the direction orthogonal to the MD direction and the refractive index ($nz$) in the thickness direction were measured in accordance with JIS K 7142-1996 5.1 (method A) using Abbe refractometer in which a light source is a sodium D line, and the plane orientation coefficient (ΔP) was calculated based on the following equation:

$$\Delta P = \{(nx+ny) - 2nz\}/2.$$

Methylene iodide was used as a contact liquid.

In the case that a covering layer was provided on one surface, a plane orientation coefficient of the opposite side surface of the covering layer was measured three times, an average value thereof was made to a plane orientation coefficient (ΔP).

In the case that covering layers were provided on both surface, a plane orientation coefficient of the surface of the covering layer was measured three times, an average value thereof was made to a plane orientation coefficient (ΔP).

(3) Total Light Transmittance and Haze

The measurement was performed in accordance with JIS K 7136 "Plastics: Method of Determining Haze of Transparent Materials". A NDH-5000 model turbidity meter manufactured by NIPPON DENSHOKU INDUSTRIES Co., Ltd. was used as a measurement meter.

(4) Heat Shrinkage (Heat Shrinkage in MD Direction and TD Direction)

Each film was cut out in a size of 10 mm width and 250 mm length to the direction for the measurement and marked at every 150 mm interval. The intervals (A) between marks were measured under a constant tension of 5 gf. Next, each film was put in an oven in an atmosphere of 150° C. and subjected to a heat treatment at 150±3° C. for 30 minutes without load. Thereafter, the intervals (B) between marks were measured under a constant tension of 5 gf. The heat shrinkage was calculated based on the following equation:

$$\text{Heat shrinkage (\%)} = (A-B)/A \times 100.$$

(5) Oxygen Permeability

The measurement was performed in accordance with JIS K 7126-2A using an oxygen permeability measurement apparatus (OX-TRAN2/21, manufactured by MOCON Inc.) under conditions of a temperature of 23° C. and a humidity of 65%. An opposite surface of covering layer was mounted to be a humidity control side.

(6) Water Vapor Permeability

The measurement was performed in accordance with JIS K 7129B using a water vapor permeability measurement apparatus (PERMATRAN-W3/33, manufactured by MOCON Inc.) under conditions of a temperature of 37.8° C. and a humidity of 90%. An opposite surface of covering layer was mounted to be a high humidityside.

(7) Intrinsic Viscosity (IV)

After crushed and dried, each polyester resin was dissolved in a mixed solvent of para-chlorophenol and tetrachloroethane (75/25 in weight ratio). The flow time of each solution having a concentration of 0.4 g/dl and the flow time of the solvent alone were measured using an Ubbelohde viscometer at 30° C., and their time ratio was employed to calculate intrinsic viscosity of the polyester resin according to Huggins' expression, assuming that the Huggins' constant was 0.38.

(8) Film Thickness

Four 5 cm-square samples were cut out from arbitrary 4 positions of each film to be measured and subjected to thickness measurement at 5 points of each sample (20 points in total) by using Millitron. The average value thereof was employed as film thickness.

(9) Oxygen Permeability Test for Packing Container (i) Production of Coloring Solution A glass container was loaded with 2 L of water and 6.6 g of powdered agar and put in hot water at 95° C. and heated for not shorter than 1 hour to completely dissolve the agar. The solution was filtered using a 50 mesh metal net to remove the gelled foreign matters. The solution was mixed with 0.04 g of methylene blue. The solution was further evenly mixed with 1.25 g of sodium hydrosulfide in a glove box in which nitrogen has previously been allowed to flow through for not shorter than 15 minutes to obtain a coloring solution (colorless).

(ii) Production of Packing Container for Film

After a polyester type adhesive was applied to each layered polyester film produced in Examples or each polyester film produced in Comparative Examples, a linear low density polyethylene film having a thickness of 40 μm (LLDPE film: L4102, manufactured by Toyobo Co., Ltd.) was dry-laminated, and the resultant film was aged in an environment of 40° C. for 3 days to obtain a laminate film. This laminate film was used to produce a three sides-sealed bag having an inner dimension of 70 mm width×105 mm height.

(iii) Charge with Coloring Solution

The three sides-sealed bag was charged with about 30 mL of the coloring solution in the glove box in which nitrogen has previously been allowed to flow through for not shorter than 15 minutes. The three sides-sealed bag was filled with nitrogen and thereafter closed with a sealer, so that a packing container filled with the coloring solution can be obtained.

(iv) Oxygen Permeability Test

After the agar was solidified at room temperature, the packing container filled with the coloring solution was transferred to a thermostatic chamber at 40° C. and color change was observed after 72 hours. The color change was determined according to the following standard, and those marked with A were regarded as acceptable.

A: Almost no color change

B: Small color change

C: Significant color change

(10) Heat Resistance Test for Layered Polyester Film

Each film sample in a size of 100 mm length×100 mm width was made available by cutting the layered polyester film. Each film sample was put in an oven heated to 130° C. for 5 minutes and its appearance change was observed. The appearance change was evaluated according the following standard, and those marked with A and B were regarded as acceptable.

A: Almost no appearance change

B: Slight appearance change

C: Significant appearance change

(11) Coefficient of Static Friction ($\mu s$) and Coefficient of Dynamic Friction ($\mu d$)

Each film was cut out into an area of 8 cm×5 cm to produce a sample. For convenience, one surface of the sample was defined as A surface and the reverse surface thereof was defined as B surface. The sample was fixed to the bottom surface of a rectangular parallelepiped body made of metal and having a bottom surface of 6 cm×5 cm in size and a weight of 1.4 kg such that the A surface faced the outer side. In this case, the 5 cm width direction of the sample and the 5 cm width direction of the metal parallelepiped body were matched, and one side of the sample in the longitudinal direction was folded and fixed to a side surface of the metal parallelepiped body by a pressure-sensitive adhesive tape.

Next, the same film was cut out into an area of 20 cm×5 cm to produce a sample, and the end part in the longitudinal direction of the sample was fixed to a flat metal plate by a pressure-sensitive adhesive tape such that the B surface faced upwardly. To this was disposed the metal parallelepiped body to which the sample was stuck such that the measurement surface was brought into contact therewith. The coefficient of static friction (μs) and coefficient of dynamic friction (μd) were measured by setting a pulling speed of 200 mm/minute under the conditions of 23° C. and 65% RH. RTM-100 manufactured by TOYO BALDWIN was used for measurement, and the coefficient of static friction (μs) and the coefficient of dynamic friction (μd) were calculated according to as K-7125.

(12) Appearance of Polyester Film Roll

Each original film obtained in Examples and Comparative Examples was slit so as to have a film width of 300 mm such that the center position in the width direction was the center of the winding core, and the resultant film was wound around a core having an inner diameter of 3 inch at a winding speed of 5 in/minute so as to have a winding length of 100 mm, so that a polyester roll was obtained.

The appearance of the polyester film roll was evaluated according to the following standard, and A and B were defined as acceptable.

A: No wrinkle is observed
B: Wrinkles are partly observed in roll
C: Wrinkles are entirely observed in roll

(13) Composition and Thickness of Thin Film Layer

The film composition of an inorganic compound was determined using a fluorescent X-ray analysis apparatus (ZSX 100 e, manufactured by Rigaku) based on a calibration curve prepared previously. The condition for the excitation X-ray tube was 50 kV and 70 mA.

The calibration curve was determined by the following procedure.

A plurality of types of films each having an inorganic compound thin film composed of aluminum oxide and silicon oxide were produced, and the deposition amount of aluminum oxide and that of silicon oxide were determined respectively by inductively coupled plasma emission method (ICP method). Next, each film for which the deposition amounts were determined was analyzed by a fluorescent X-ray analysis apparatus (ZSX 100 e, manufactured by Rigaku; condition for excitation X-ray tube: 50 kV and 70 mA) to determine the fluorescent X-ray intensity for aluminum oxide and silicon oxide of each sample. The calibration curve was prepared from the relation of the fluorescent X-ray intensity and the deposition amount determined by ICP.

The deposition amount determined by ICP was expressed by basically mass unit, and therefore the mass unit was converted as follows so as to obtain film composition.

The film thickness was calculated while the inorganic oxide thin film was assumed to have a bulky density of 80% and aluminum oxide and silicon oxide were assumed to have respective volumes even in mixed state.

The content a (% by mass) of aluminum oxide in the film and the content ws (% by mass) of silicon oxide in the film are calculated from the following equations (1) and (2) in which Ma (g/cm$^2$) is defined as the deposition amount of aluminum oxide per unit area and Ms (g/cm$^2$) is defined as the deposition amount of silicon oxide per unit area.

$$wa=100\times[Ma/(Ma+Ms)] \quad (1)$$

$$ws=100-wa \quad (2)$$

Specifically, if the deposition amount of aluminum oxide per unit area is defined as Ma (g/cm$^2$), its bulk density is defined as pa (3.97 g/cm$^3$), the deposition amount of silicon oxide per unit area is defined as Ms (g/cm$^2$), and its bulk density is defined as (μs) (2.65 g/cm$^3$), the film thickness t (nm) is calculated from the following formula (3).

$$t=(Ma/(\rho a\times0.8)+Ms/(\rho s\times0.8))\times10^7 \quad (3)$$

The film thickness value determined by fluorescent X-ray analysis apparatus was close to the film thickness determined actually by TEM.

(14) Thickness of Covering Layer

The thickness of the covering layer was measured in a cross-section of each layered polyester film using a transmission type electron microscope.

Formulation of Coating Liquid A for Forming Coating Layer:

Into a reactor were charged dimethyl terephthalate (95 parts by mass), dimethyl isophthalate (95 parts by mass), ethylene glycol (35 parts by mass), neopentyl glycol (145 parts by mass), zinc acetate (0.1 part by mass), and antimony trioxide (0.1 part by mass). At 180° C., the reactive components thereof were caused to undergo an interesterification reaction over 3 hours. Next, thereto was added sodium 5-sulfoisophthalate (6.0 parts by mass) to cause the reactive components to undergo an interesterification reaction at 240° C. over 1 hour. Thereafter, the polymerizable components thereof were caused to undergo a polycondensation reaction at 250° C. under a reduced pressure (of 0.2 to 10 mmHg) over 2 hours to yield a copolymerized polyester (A) having a number-average molecular weight of 19,500 and a softening point of 60° C.

The following were mixed with each other: 7.5 parts by mass of a 30%-by-mass liquid dispersion in which the resultant copolymerized polyester (A) was dispersed in water; 11.3 parts by mass of a 20%-by-mass aqueous solution of a self-crosslinkable polyurethane (B) (ELASTRON H-3, manufactured by DKS Co., Ltd.), which contained isocyanate groups blocked with sodium bisulfite; 0.3 part by mass of a catalyst (Cat 64, manufactured by DKS Co., Ltd.) for the product ELASTRON; 39.8 parts by mass of water; and 37.4 parts by mass of isopropyl alcohol. Furthermore, thereto were added 0.6 part by mass of a 10%-by-mass aqueous solution of a fluorine-containing nonionic surfactant (MEGAFAC (registered trade name) F444, manufactured by DIC Corp.), 2.3 parts by mass of a 20%-by-mass aqueous dispersion liquid of a colloidal silica (SNOWTEX (registered trade name) OL, manufactured by Nissan Chemical Industries, Ltd.; average particle diameter: 40 nm) as particles P, 0.5 part by mass of a 3.5%-by-mass aqueous dispersion liquid of a dry-method silica (AEROSIL OX50, manufactured by Nippon Aerosil Co., Ltd.; average particle diameter: 200 m, and average primary particle diameter: 40 nm) as particles Q. Next, the pH of the coating liquid for forming a coating layer was adjusted to 6.2 with a 5%-by-mass sodium bicarbonate aqueous solution, and then the liquid was subjected to precise filtration through a felt-type polypropylene filter having a filtrating particle size (initial filtrating efficiency: 95%) of 10 μm to prepare a coating liquid A for forming the coating layer.

Example 1

As a raw material, polyethylene 2,5-furandicarboxylate manufactured by a company Avantiuin (IV=0.90) was used. The material was dried at 100° C. under a reduced pressure (1 Torr) for 24 hours, and then supplied to a biaxial extruder (screw diameter: 30 mm, and L/D=25). While the resin temperature at moieties of the extruder, from a melting moiety thereof through a kneading moiety and a pipe thereof to a gear pump thereof, was set to 270° C., and the temperature in any pipe after the moieties was set to 275° C., the resin supplied into the biaxial extruder was melted and extruded through a T die (mouthpiece) into a sheet form.

The extruded resin was cast onto a cooling drum having a surface temperature of 20° C., and a static electricity method was used to cause the resin to adhere closely onto the surface of the cooling drum to cool and solidify the resin. In this way, an unstretched film was produced which had a thickness of 300 μm.

The resultant unstretched sheet was raised in film-temperature through rolls heated to 120° C., and then stretched 5 times in the MD direction through rolls different from each other in peripheral speed to yield a monoaxially stretched film.

A reverse roll method was used to apply the coating liquid A prepared by the above-mentioned method, for forming the coating layer, onto the monoaxially stretched film, and then the resultant was dried. The application amount (coat amount) of the dried coating liquid A for forming the coating layer was 0.1 g/m². After the application, the resultant film was led into a tenter, and grasped with clips to be TD-stretched. The carrying speed thereof was set to 5 m/min. The stretching temperature during the TD direction stretching was set to 105° C.; and the stretching ratio in the TD direction, to 5. Next, the workpiece was thermally treated at 200° C. for 12 seconds, and then subjected to a 5% relaxation treatment at 190° C. to yield a polyester film. Physical properties of the resultant film are shown in Table 1.

The workpiece was stretched 5 times into the MD direction at a stretching temperature of 120° C. in the MD direction, and stretched 5 times into the TD direction at a stretching temperature of 105° C. in the TD direction to make it possible to heighten the heat fixation temperature to 200° C. About physical properties of the resultant film, the thickness was 15.5 μm, and the respective heat shrinkage rates in the MD and TD directions were 4.3% and 4.3%. The respective breaking strengths in the MD and TD directions were 260 MPa and 255 MPa. The plane orientation coefficient ($\Delta P$) was 0.147. Thus, the layered polyester film was successfully yielded with excellent mechanical properties, transparency, heat resistance and gas barrier performance, and further with an excellent slipping-property.

Example 2

A polyester film was yielded in the same way as in Example 1 except that: the resin used for the coating layer was changed to a polyurethane resin (WPB 341, manufactured by Mitsui Chemicals, Inc.); the inorganic particles, to silica particles (MP 4540M, manufactured by Nissan Chemical Industries, Ltd.) having an average particle diameter of 450 nm; and the addition amount proportion of the inorganic particles in the whole of the resin composition for forming the coating layer, to 0.3% by mass. Physical properties of the resultant film are shown in Table 1.

Example 3

A layered polyester film was yielded in the same way as in Example 1 except that: the resin used for the coating layer was changed to an acrylic resin (JONCRYL 63J, manufactured by the company BSF); the inorganic particles, to silica particles (MP 4540M, manufactured by Nissan Chemical Industries, Ltd.) having an average particle diameter of 450 nm; and the addition amount proportion of the inorganic particles in the whole of the resin composition for forming the coating layer, to 0.3% by mass. Physical properties of the resultant film are shown in Table 1.

Examples 4 to 5

Layered polyester films were each yielded in the same way as in Example 2 except that the addition amount proportion of the inorganic particles was changed as shown in Table 1. Physical properties of the resultant films are shown in Table 1.

Example 6

A layered polyester film was yielded in the same way as in Example 4 except that the inorganic particles were changed to mica particles (SOMASIF (registered trade name) MEB-3, manufactured by Katakura & Co-op Agri Corp.) having an average particle diameter of 3.0 μm. Physical properties of the resultant film are shown in Table 1.

Example 7

A layered polyester film was yielded in the same way as in Example 6 except that a surfactant (SURFYNOL (registered trade name) SE-F, manufactured by Air Products and Chemicals, Inc.) was added, and the addition amount proportion of the surfactant in the whole of the resin composition for forming the coating layer was set to 0.03% by mass. Physical properties of the resultant film are shown in Table 1.

Example 8

A layered polyester film was yielded in the same way as in Example 7 except that the proportion of the solvent isopropyl alcohol. (IPA) was changed to 25%. Physical properties of the resultant film are shown in Table 1.

Example 9

$Al_2O_3$ (purity: 99.5%) and $SiO_2$ (purity: 99.9%) in the form of particles having a size of about 3 to 5 mm were used as vapor deposition sources to vaporize and deposit the $Al_2O_3$ and the $SiO_2$ simultaneously onto a surface of the layered polyester film yielded in Example 1 that was opposite to the coating layer of the film, using an electron beam vapor deposition method. In this way, an $Al_2O_3$—$SiO_2$ based thin film layer was formed. About the vapor deposition materials, the particulate $Al_2O_3$ and the particulate $SiO_2$ were charged, without being mixed with each other, into two departments of a circular crucible having a diameter of 40 mm, the departments being partitioned with a carbon plate. The above-mentioned polyester film was set onto a supporting plate. As a heating source, one electron gun was used to radiate an electron beam onto the $Al_2O_3$ and the $SiO_2$ in a time-sharing manner to heat, the $Al_2O_3$ and the $SiO_2$. In this way, these materials were heated and gasified to mix the $Al_2O_3$ and the $SiO_2$ with each other to be vaporized and deposited. At this time, the emission current of the electron gun was set to 205 mA; and the acceleration voltage, to 6 kV. Electric powers corresponding to 60 mA×6 kV and 45 mA×6 kV were applied to the aluminum oxide and the silicon oxide, respectively, charged in the crucible. At the vapor deposition time, the vacuum pressure and the temperature of the film supporter were set to $1.1 \times 10^{-4}$ Pa and 23° C., respectively. The thin film layer was vaporized and deposited by changing the film-forming speed, so as to give a thickness of 20 nm, using a crystal vibrator type film thickness meter. In this way, a layered polyester film having a coating layer as well as the thin film layer was yielded. Physical properties of the resultant film are shown in Table 1.

Example 10

A polyester film having a coating layer and a thin film layer was yielded in the same way as in Example 9 except that the layered polyester film was changed to the layered polyester film yielded in Example 5. Physical properties of the resultant film are shown in Table 1.

Example 11

A polyester film having a coating layer and a thin film layer was yielded in the same way as in Example 9 except that the layered polyester film was changed to the layered polyester film yielded in Example 8. Physical properties of the resultant film are shown in Table 1.

Comparative Example 1

As a raw material, poly(ethylene 2,5-furandicarboxylate) manufactured by a company Avantium (IV=0.90) was used. The material was dried at 100° C. under a reduced pressure (1 Torr) for 24 hours, and then supplied to a biaxial extruder (screw diameter: 30 mm, and L/D=25). While the resin temperature at moieties of the extruder, from a melting moiety thereof through a kneading moiety and a pipe thereof to a gear pump thereof, was set to 270° C. and the temperature in any pipe after the moieties was set to 275° C., the resin supplied into the biaxial extruder was melted and extruded through a T die (mouthpiece) into a sheet form.

The extruded resin was cast onto a cooling drum having a surface temperature of 20° C., and a static electricity method was used to cause the resin to adhere closely onto the surface of the cooling drum to cool and solidify the resin. In this way, an unstretched film was produced which had a thickness of 300 μm.

The resultant unstretched sheet was raised in film-temperature through rolls heated to 120° C., and then stretched 5 times in the MD direction through rolls different from each other in peripheral speed to yield a monoaxially stretched film.

Next, the resultant monoaxially stretched film was wound onto a tenter, and grasped with clips to be TD-stretched. The carrying speed thereof was set to 5 m/min. The stretching temperature during the TD direction stretching was set to 105° C.; and the stretching ratio in the TD direction, to 5. Next, the workpiece was thermally treated at 200° C. for 12 seconds, and then subjected to a 5% relaxation treatment at 190° C. to yield a polyester film. Physical properties of the resultant film are shown in Table 2.

Comparative Example 2

A polyester film was yielded in the same way as in Example 1 except that the film-forming conditions for the polyester film were changed as shown in Table 2. Physical properties of the resultant film are shown in Table 2.

Comparative Example 3

An attempt was made for forming a polyester film in the same way as in Comparative Example 2 except that the heat fixation temperature was changed to 200° C., As a result, the film was broken in the heat fixation step. Thus, a stretched film failed in being yielded in a case where the stretching ratio in the MD direction was 3.4 and the stretching ratio in the TD direction was 4.0, the film did not resist against the stretching to be broken when the heat fixation temperature was set to 200° C. Thus, the film was broken.

TABLE 1

| | Item | | | Example 1 | Example 2 | Example 3 | Example 4 | Example 5 | Example 6 |
|---|---|---|---|---|---|---|---|---|---|
| Intrinsic Viscosity | | | (dL/g) | 0.7 | 0.7 | 0.7 | 0.7 | 0.7 | 0.7 |
| Production Condition of Polyester Film | Stretching Ratio of MD Direction | | (—) | 5 | 5 | 5 | 5 | 5 | 5 |
| | Temperature during Stretching MD Direction | | (° C.) | 120 | 120 | 120 | 120 | 120 | 120 |
| | Stretching Ratio of TD Direction | | (—) | 5 | 5 | 5 | 5 | 5 | 5 |
| | Temperature during Stretching TD Direction | | (° C.) | 105 | 105 | 105 | 105 | 105 | 105 |
| | Heat Fixation Temperature | | (° C.) | 200 | 200 | 200 | 200 | 200 | 200 |
| | Relaxation Ratio during TD Relaxation Treatment | | (%) | 5 | 5 | 5 | 5 | 5 | 5 |
| | Temperature during TD Relaxation Treatment | | (° C.) | 190 | 190 | 190 | 190 | 190 | 190 |
| Layered Polyester Film | Breaking Strength | MD | (MPa) | 260 | 260 | 260 | 260 | 260 | 260 |
| | | TD | (MPa) | 255 | 255 | 255 | 255 | 255 | 255 |
| | Breaking Elongation | MD | (%) | 47 | 47 | 47 | 47 | 47 | 47 |
| | | TD | (%) | 42 | 42 | 42 | 42 | 42 | 42 |
| | Refractive Index | Nx | (—) | 1.6292 | 1.6292 | 1.6292 | 1.6292 | 1.6292 | 1.6292 |
| | | Ny | (—) | 1.6242 | 1.6242 | 1.6242 | 1.6242 | 1.6242 | 1.6242 |
| | | Nz | (—) | 1.4801 | 1.4801 | 1.4801 | 1.4801 | 1.4801 | 1.4801 |
| | Plane Orientation Coefficient($\Delta P$) | | (—) | 0.147 | 0.147 | 0.147 | 0.147 | 0.147 | 0.147 |
| | Heat Shrinkage Rate | MD | (%) | 4.3 | 4.3 | 4.3 | 4.3 | 4.3 | 4.3 |
| | | TD | (%) | 4.3 | 4.3 | 4.3 | 4.3 | 4.3 | 4.3 |
| | Haze | | (%) | 0.5 | 0.6 | 0.65 | 0.63 | 0.81 | 0.81 |
| | Total Light Transmittance | | (%) | 90.3 | 90.5 | 90.1 | 90.3 | 90.5 | 90.5 |
| | Thickness | | (μm) | 15.5 | 15.5 | 15.5 | 15.5 | 15.5 | 15.5 |
| | OxygenPermeability | | (mL/m$^2$/day/MPa) | 85 | 85 | 85 | 85 | 85 | 85 |

TABLE 1-continued

|  |  |  |  |  |  |  |  |  |  |
|---|---|---|---|---|---|---|---|---|---|
|  | Water VaporPermeability |  | (g/m²/day) | 10.8 | 10.8 | 10.8 | 10.8 | 10.8 | 10.8 |
|  | Coefficient of static friction (μs) |  | (—) | 0.54 | 0.9 | 0.76 | 0.76 | 0.7 | 0.93 |
|  | Coefficient of dynamic friction (μd) |  | (—) | 0.52 | 0.53 | 0.53 | 0.53 | 0.5 | 0.76 |
| Covering | Resin | kind | (—) | Coating | WPB341 | 63J | WPB341 | WPB341 | WPB341 |
| Layer | Inorganic particle | kind | (—) | solution | MP4540M | MP4540M | MP4540M | MP4540M | MEB-3 |
|  |  | amount of the added resin | (mass %) | A | 0.3 | 0.3 | 0.5 | 1 | 0.5 |
|  | Surfactant | kind | (—) |  | None | None | None | None | None |
|  |  | amount of the added resin | (mass %) |  |  |  |  |  |  |
|  | Solvent | Ratio of IPA | (%) | 20 | 20 | 20 | 20 | 20 | 20 |
| Thin Film | Thickness |  | (nm) | 45 | 71 | 72 | 73 | 72 | 68 |
| Layer | Thickness |  | (nm) | — | — | — | — | — | — |
|  | Ratio of Al₂O₃ |  | (%) | — | — | — | — | — | — |
|  | Ratio of SiO₂ |  | (%) | — | — | — | — | — | — |
| Appearance of polyester film roll |  |  |  | A | B | A | A | A | B |
| Oxygen Permeability Test for Packing Container |  |  |  | B | B | B | B | B | E3 |
| Heat Resistance Test for Layered Polyester Film |  |  |  | A | A | A | A | A | A |

| Item |  |  |  | Example 7 | Example 8 | Example 9 | Example 10 | Example 11 |
|---|---|---|---|---|---|---|---|---|
| Intrinsic Viscosity |  |  | (dL/g) | 0.7 | 0.7 | 0.7 | 0.7 | 0.7 |
| Production | Stretching Ratio of MD Direction |  | (—) | 5 | 5 | 5 | 5 | 5 |
| Condition of | Temperature during Stretching MD Direction |  | (° C.) | 120 | 120 | 120 | 120 | 120 |
| Polyester Film | Stretching Ratio of TD Direction |  | (—) | 5 | 5 | 5 | 5 | 5 |
|  | Temperature during Stretching TD Direction |  | (° C.) | 105 | 105 | 105 | 105 | 105 |
|  | Heat Fixation Temperature |  | (° C.) | 200 | 200 | 200 | 200 | 200 |
|  | Relaxation Ratio during TD Relaxation Treatment |  | (%) | 5 | 5 | 5 | 5 | 5 |
|  | Temperature during TD Relaxation Treatment |  | (° C.) | 190 | 190 | 190 | 190 | 190 |
| Layered | Breaking Strength | MD | (MPa) | 260 | 260 | 260 | 263 | 262 |
| Polyester |  | TD | (MPa) | 255 | 255 | 255 | 258 | 257 |
| Film | Breaking Elongation | MD | (%) | 47 | 47 | 47 | 45 | 48 |
|  |  | TD | (%) | 42 | 42 | 42 | 41 | 44 |
|  | Refractive Index | Nx | (—) | 1.6292 | 1.6292 | 1.6292 | 1.6317 | 1.6317 |
|  |  | Ny | (—) | 1.6242 | 1.6242 | 1.6242 | 1.6219 | 1.6219 |
|  |  | Nz | (—) | 1.4801 | 1.4801 | 1.4801 | 1.4812 | 1.4812 |
|  | Plane Orientation Coefficient(△P) |  | (—) | 0.147 | 0.147 | 0.147 | 0.146 | 0.146 |
|  | Heat Shrinkage Rate | MD | (%) | 4.3 | 4.3 | 4.3 | 4.1 | 4.1 |
|  |  | TD | (%) | 4.3 | 4.3 | 4.3 | 3.9 | 3.9 |
|  | Haze |  | (%) | 0.86 | 0.91 | 0.5 | 0.81 | 0.91 |
|  | Total Light Transmittance |  | (%) | 90.4 | 90.5 | 90.3 | 90.5 | 90.5 |
|  | Thickness |  | (μm) | 15.5 | 15.5 | 15.5 | 15.6 | 15.6 |
|  | OxygenPermeability |  | (mL/m²/day/MPa) | 85 | 85 | 7.6 | 7.6 | 7.6 |
|  | Water VaporPermeability |  | (g/m²/day) | 10.8 | 10.8 | 1.3 | 1.3 | 1.3 |
|  | Coefficient of static friction (μs) |  | (—) | 0.62 | 0.44 | 0.55 | 0.7 | 0.44 |
|  | Coefficient of dynamic friction (μd) |  | (—) | 0.34 | 0.33 | 0.53 | 0.5 | 0.33 |
| Covering | Resin | kind | (—) | WPB341 | WPB341 | Coating | WPB341 | WPB341 |
| Layer | Inorganic particle | kind | (—) | MEB-3 | MEB-3 | solution | MP4540M | MEB-3 |
|  |  | amount of the added resin | (mass %) | 0.5 | 0.5 | A | 1 | 0.5 |
|  | Surfactant | kind | (—) | SE-F | SE-F |  | None | SE-F |
|  |  | amount of the added resin | (mass %) | 0.03 | 0.03 |  |  | 0.03 |
|  | Solvent | Ratio of IPA | (%) | 20 | 25 | 25 | 25 | 25 |
| Thin Film | Thickness |  | (nm) | 41 | 46 | 46 | 41 | 45 |
| Layer | Thickness |  | (nm) | — | — | 20.4 | 20.2 | 20.4 |
|  | Ratio of Al₂O₃ |  | (%) | — | — | 51.8 | 51.7 | 51.5 |
|  | Ratio of SiO₂ |  | (%) | — | — | 48.1 | 48.3 | 48.3 |
| Appearance of polyester film roll |  |  |  | A | A | A | A | A |
| Oxygen Permeability Test for Packing Container |  |  |  | B | B | A | A | A |
| Heat Resistance Test for Layered Polyester Film |  |  |  | A | A | A | A | A |

TABLE 2

| Item |  |  | Comparative Example 1 | Comparative Example 2 | Comparative Example 3 |
|---|---|---|---|---|---|
| Intrinsic Viscosity |  | (dL/g) | 0.7 | 0.7 | 0.7 |
| Production | Stretching Ratio of MD Direction | (—) | 5 | 3.4 | 3.4 |
| Condition of | Temperature during Stretching MD Direction | (° C.) | 120 | 110 | 110 |
| Polyester |  |  |  |  |  |

TABLE 2-continued

| Item | | | Comparative Example 1 | Comparative Example 2 | Comparative Example 3 |
|---|---|---|---|---|---|
| Film | Stretching Ratio of TD Direction | (—) | 5 | 4 | 4 |
| | Temperature during Stretching TD Direction | (° C.) | 105 | 105 | 105 |
| | Heat Fixation Temperature | (° C.) | 200 | 120 | 200 |
| | Relaxation Ratio during TD Relaxation Treatment | (%) | 5 | 5 | 5 |
| | Temperature during TD Relaxation Treatment | (° C.) | 190 | 110 | 190 |
| Layered Polyester Film | Breaking Strength MD | (MPa) | 275 | 129 | Film was broken |
| | TD | (MPa) | 252 | 141 | |
| | Breaking Elongation MD | (%) | 47 | 166 | |
| | TD | (%) | 46 | 154 | |
| | Refractive Index Nx | (—) | 1.6317 | 1.5700 | |
| | Ny | (—) | 1.6219 | 1.5782 | |
| | Nz | (—) | 1.4839 | 1.5347 | |
| | Plane Orientation Coefficient($\Delta$P) | (—) | 0.143 | 0.0394 | |
| | Heat Shrinkage Rate MD | (%) | 3.3 | 43 | |
| | TD | (%) | 4.3 | 45 | |
| | Haze | (%) | 0.35 | 1.2 | |
| | Total Light Transmittance | (%) | 89.3 | 90.4 | |
| | Thickness | (μm) | 12 | 22.8 | |
| | Oxygen Permeability | (mL/m$^2$/day/MPa) | 107 | 114 | |
| | Water Vapor Permeability | (g/m$^2$/day) | 15.6 | 15 | |
| | Coefficient of static friction (μs) | (—) | 2.2 | 0.55 | |
| | Coefficient of dynamic friction (μd) | (—) | 1.1 | 0.53 | |
| Covering Layer | Resin kind | (—) | — | Coating solution | Coating solution |
| | Inorganic particle kind | (—) | — | A | A |
| | amount of the added resin | (mass %) | — | | |
| | Surfactant kind | (—) | — | | |
| | amount of the added resin | (mass %) | — | | |
| | Solvent Ratio of IPA | (%) | — | 20 | 20 |
| | Thickness | (nm) | — | — | — |
| Thin Film Layer | Thickness | (nm) | — | — | — |
| | Ratio of Al$_2$O$_3$ | (%) | — | — | — |
| | Ratio of SiO$_2$ | (%) | — | — | — |
| Appearance of polyester film roll | | | C | A | — |
| Oxygen Permeability Test for Packing Container | | | B | B | — |
| Heat Resistance Test for Layered Polyester Film | | | A | C | — |

The invention claimed is:

1. A layered polyester film comprising a polyester film and a covering layer, wherein
the polyester film is a biaxially oriented polyester film including a dicarboxylic acid component containing mainly a furandicarboxylic acid and a glycol component containing mainly ethylene glycol,
the covering layer is formed on at least one surface of the polyester film, and
the layered polyester film has a plane orientation coefficient $\Delta P$ of not less than 0.100 and not more than 0.200, and a thickness of the layered polyester film is not thinner than 1 μm and not thicker than 300 μm.

2. The layered polyester film according to claim 1, wherein the layered polyester film has an oxygen permeability of not less than 0.1 mL/m$^2$/day/MPa and not more than 1000 mL/m$^2$/day/MPa under a temperature of 23° C. and a humidity of 65%.

3. The layered polyester film according to claim 2, wherein the covering layer contains at least one kind resin selected from a polyester-based resin, a urethane-based resin, and an acrylic-based resin.

4. The layered polyester film according to claim 2, wherein the covering layer further contains inorganic particles.

5. The layered polyester film according to claim 2, wherein the layered polyester film has a coefficient of static friction (μs) of not more than 1.0 and a coefficient of dynamic friction (μd) of not more than 1.0.

6. The layered polyester film according to claim 2, wherein the layered polyester film has a heat shrinkage rate of not less than 0.01% and not more than 30% when heated at 150° C. for 30 minutes.

7. The layered polyester film according to claim 1, wherein the covering layer contains at least one kind resin selected from a polyester-based resin, a urethane-based resin, and an acrylic-based resin.

8. The layered polyester film according to claim 1, wherein the covering layer further contains inorganic particles.

9. The layered polyester film according to claim 1, wherein the layered polyester film has a coefficient of static friction (μs) of not more than 1.0 and a coefficient of dynamic friction (μd) of not more than 1.0.

10. The layered polyester film according to claim 1, wherein the layered polyester film has a heat shrinkage rate of not less than 0.01% and not more than 30% when heated at 150° C. for 30 minutes.

11. The layered polyester film according to claim 1, wherein the layered polyester film has a heat shrinkage rate of not less than 0.01% and not more than 20% when heated at 150° C. for 30 minutes.

12. The layered polyester film according to claim 1, wherein the layered polyester film has a heat shrinkage rate of not less than 0.01% and not more than 10% when heated at 150° C. for 30 minutes.

13. A polyester film roll obtained by winding the layered polyester film according to claim 1.

* * * * *